(12) United States Patent
Okada

(10) Patent No.: US 9,957,796 B2
(45) Date of Patent: May 1, 2018

(54) TUNNEL BORING MACHINE

(71) Applicant: HITACHI ZOSEN CORPORATION, Osaka (JP)

(72) Inventor: Toshiyuki Okada, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 0 days. days.

(21) Appl. No.: 15/560,269

(22) PCT Filed: Jan. 20, 2016

(86) PCT No.: PCT/JP2016/051591
§ 371 (c)(1),
(2) Date: Sep. 21, 2017

(87) PCT Pub. No.: WO2016/152218
PCT Pub. Date: Sep. 29, 2016

(65) Prior Publication Data
US 2018/0073362 A1  Mar. 15, 2018

(30) Foreign Application Priority Data

Mar. 24, 2015 (JP) ................. 2015-060670

(51) Int. Cl.
*E21D 9/11* (2006.01)
*E21D 9/10* (2006.01)
*E21D 9/08* (2006.01)
*E21D 9/087* (2006.01)

(52) U.S. Cl.
CPC ........... *E21D 9/108* (2013.01); *E21D 9/1013* (2013.01); *E21D 9/08* (2013.01); *E21D 9/087* (2013.01); *E21D 9/10* (2013.01); *E21D 9/11* (2013.01)

(58) Field of Classification Search
CPC .. E21D 9/08; E21D 9/087; E21D 9/10; E21D 9/11
USPC ............ 299/1.05, 1.1, 1.2, 1.4, 1.8; 405/138
See application file for complete search history.

(56) References Cited

U.S. PATENT DOCUMENTS 4,079,795 A    3/1978  Sackmann et al.
2004/0207247 A1*  10/2004  Jackson .................. E21C 25/16
                                                         299/85.1

FOREIGN PATENT DOCUMENTS

| JP | 61-152097 U | 9/1986 |
| JP | 62-211492 A | 9/1987 |
| JP | 11-101091 A | 4/1999 |
| JP | 2002-004772 A | 1/2002 |
| JP | 2009-221802 A | 10/2009 |

OTHER PUBLICATIONS

International Search Report PCT/JP2016/051591 dated Feb. 23, 2016 with English translation.

* cited by examiner

*Primary Examiner* — Sunil Singh
(74) *Attorney, Agent, or Firm* — Pillsbury Winthrop Shaw Pittman, LLP

(57) ABSTRACT

The tunnel boring machine includes a data processing unit configured to obtain error data ($E_r$) based on a current measurement value (Vp) of the strain sensor obtained at a current angle (θ) of the cutter head and a past corresponding measurement value (Vo) obtained at a corresponding angle corresponding to the current angle, to correct the current measurement data using the error data.

6 Claims, 17 Drawing Sheets

Example of Processing by Data Processing Device
(Calculation of Measurement Data of Cutter Thrust Force)

| | Time(sec) | $\theta$ | C1 | C2 | Cutter Thrust Force (etc.) |
|---|---|---|---|---|---|
| | 0 | 0 | 0 | 0 | |
| Rotation | 1 | 1 | 1 | 0 | $F = K \times Gave(\theta)$: No Correction |
| ($\|\theta_{old} - \theta\| > 0$) | ⋮ | ⋮ | ⋮ | ⋮ | |
| | 360 | 0 | 360 | 0 | $F = K \times [Gave(\theta) - Er(\theta)]$: Correction |
| | ⋮ | ⋮ | ⋮ | ⋮ | |
| | 720 | 0 | 720 | 0 | C1 Reaches Upper Limit (720) |
| | 721 | 1 | 720 | 0 | |
| | ⋮ | ⋮ | ⋮ | ⋮ | |
| No Change in Angle | T0 | N | 720 | 0 | |
| ($\|\theta_{old} - \theta\| = 0$) | T1 | N | 720 | 1 | C2 Count Up |
| | T2 | N | 720 | 2 | |
| | ⋮ | ⋮ | ⋮ | ⋮ | |
| Determine Rotation | T9 | N | 720 | 9 | |
| has been Stopped | T10 | N | 660 | 10 | C2 Reaches Upper Limit (10), Subtraction from C1 (-60) |
| | U1 | N | 600 | 10 | |
| | U2 | N | 540 | 10 | |
| | U3 | N | 480 | 10 | |
| | U4 | N | 420 | 10 | |
| Stop-standby Time | U5 | N | 360 | 10 | |
| Elapsed | U6 | N | 300 | 10 | |
| | U7 | N | 240 | 10 | $F = K \times Gave(\theta)$: No Correction |
| | U8 | N | 180 | 10 | |
| | U9 | N | 120 | 10 | |
| | U10 | N | 60 | 10 | |
| | U11 | N | 0 | 10 | |
| | U12 | N | 0 | 10 | C1=0 (C1<0) |
| | U13 | N | 0 | 10 | |
| | ⋮ | ⋮ | ⋮ | ⋮ | |
| Rotation | V1 | N+1 | 1 | 0 | C2=0 |

Fig. 10

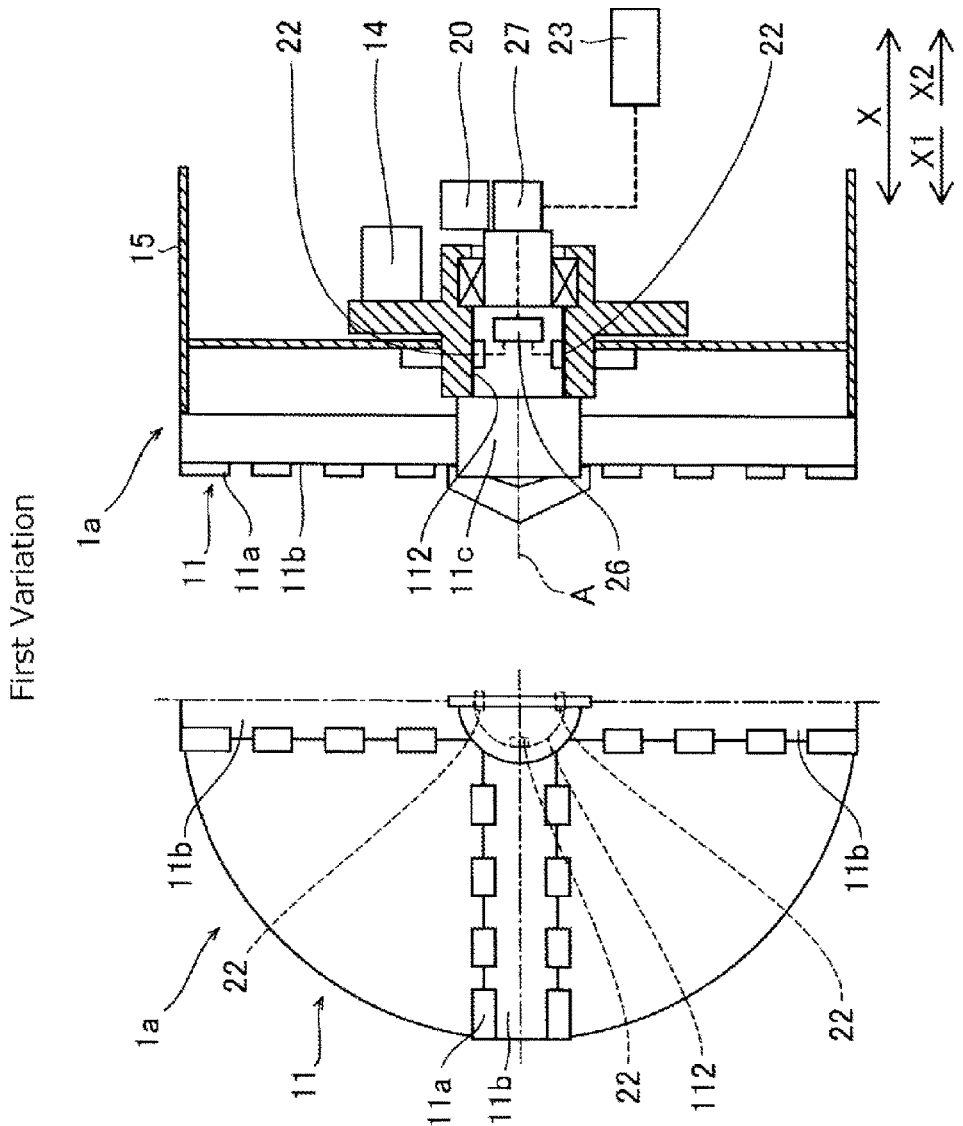

TUNNEL BORING MACHINE

CROSS-REFERENCE TO RELATED APPLICATIONS

This application is the U.S. National Stage of PCT/JP2016/051591, filed Jan. 20, 2016, which in turn claims priority to Japanese Patent Application No. JP 2015-060670, filed Mar. 24, 2015. The contents of these applications are incorporated herein by reference in their entireties.

TECHNICAL FIELD

The present invention relates to a tunnel boring machine, and in particular to a tunnel boring machine that measures strain of rotational parts such as a cutter head.

BACKGROUND

There have been conventionally known tunnel boring machines that measure strain of rotational parts such as a cutter head. An example of such tunnel boring machines is disclosed in Japanese Utility Model Application Publication No. Sho 61-152097.

In the tunnel boring machine disclosed in Japanese Utility Model Application Publication No. Sho 61-152097, a strain sensor mounted on rotational parts such as a cutter head measures strain. The tunnel boring machine advances forward by a thrust force of a thrust jack, while rotating the cutter head, thereby to bore a tunnel in the natural ground. While the force acting on the cutter head (cutter thrust force) is typically estimated by subtracting from the jack thrust force various resistances such as the frictional resistance between the outer periphery of the body and the natural ground, Japanese Utility Model Application Publication No. Sho 61-152097 describes obtaining the cutter thrust force more directly by using a strain measurement value.

In boring, the tunnel boring machine may straddle different strata or encounter buried objects or gravel. It is important to measure the cutter thrust force to prevent damage to the cutter head and the cutter driving unit and abnormal wear of cutter bits (boring edges).

RELEVANT REFERENCES

List of Relevant Patent Literature

Patent Literature 1: Japanese Utility Model Application Publication No. Sho 61-152097

SUMMARY

However, when a strain sensor is mounted on the rotational parts such as a cutter head, the portion that measures strain moves rotationally, and thus the strain measurement value includes the measurement error occurring along with the rotation. Therefore, there has been a demand for a tunnel boring machine that can measure more accurately the force acting on the cutter head.

The present invention is intended to overcome the above problem, and one object thereof is to provide a tunnel boring machine that can suppress the measurement error occurring along with the rotation so as to measure more accurately the force acting on the cutter head.

To achieve the above object, a tunnel boring machine according to one aspect of the present invention includes: a cutter head; a cutter support supporting the cutter head and configured to rotate with the cutter head; a cutter driving unit for rotationally driving the cutter head and the cutter support a rotational angle sensing unit for sensing a rotational angle of the cutter head; a strain sensor provided in the cutter head or the cutter support; and a data processing unit for obtaining measurement data of a force acting on the cutter head, based on a measurement result of the strain sensor, wherein the data processing unit is configured to obtain error data based on a current measurement value of the strain sensor obtained at a current angle of the cutter head and a past corresponding measurement value obtained at a corresponding angle corresponding to the current angle, thereby to correct the current measurement data using the error data.

The concept of "current measurement value" includes, not only the strain measurement value at a current rotational angle, but also the strain measurement value at a rotational angle deemed to be equivalent to the current rotational angle. For example, in addition to the strain measurement value at the current real-time rotational angle, the current measurement value may include the strain measurement value at the rotational angle of the preceding sampling cycle (the preceding sampling data immediately prior to the current angle sensing value) and the strain measurement value at the rotational angle smaller than the current angle θ by one degree (θ−1 degree). Likewise, the concept of "corresponding measurement value" may be a past strain measurement value at a rotational angle slightly different from the current angle, instead of a past strain measurement value at the rotational angle strictly equal to the current angle (e.g., the same angle occurring in the preceding rotation).

As described above, in a tunnel boring machine according to one aspect of the present invention, the data processing device may be configured to obtain error data based on the current measurement value of the strain sensors obtained at the current angle of the cutter head and a past corresponding measurement value obtained at a corresponding angle corresponding to the current angle, thereby to correct the current measurement data using the error data. As a result of study, the Inventor of the present invention has found that the measurement error occurring along with the rotation of the cutter head varies with the rotation while varying cyclically in accordance with the rotational angle. Therefore, according to the present invention, the current measurement data is corrected using error data obtained based on the current measurement value and the corresponding measurement value obtained at a past rotational angle corresponding to the current angle, so as to effectively perform correction with the error component occurring along with the rotation, taking advantage of the cyclicity of the measurement error occurring along with the rotation. As a result, it is possible to suppress the measurement error occurring along with the rotation to measure more accurately the force acting on the cutter head.

In the tunnel boring machine according to the one aspect, the corresponding measurement value is preferably a measurement value of the strain sensor obtained one rotation prior to the current angle. Thus, the error data can be obtained based on the most recent corresponding measurement value obtained one rotation before. Therefore, there is less effect of change of situation between the current time and the point when the corresponding measurement value was obtained (the change of the jack thrust force and the change of situation of the natural ground), as compared to the case where an older corresponding measurement value obtained a plurality of rotations before is used. As a result, the obtained error data more accurately reflects the measurement error occurring along with the rotation, and therefore, more accurate correction is possible with the measurement error occurring along with the rotation.

In the tunnel boring machine according to the one aspect, the data processing unit is preferably configured to calculate the error data using a reference value, the current measurement value and the corresponding measurement value, the reference value being calculated using a plurality of measurement values of the strain sensor over at least one past rotation. With this arrangement, use of the measurement values over at least one past rotation makes it possible to obtain a reference value sufficiently reflecting the cyclicity of the measurement error occurring along with the rotation. Further, the error data reflecting the measurement error occurring along with the rotation can be readily obtained by evaluating the difference between the reference value and the measurement values at the current rotational angle (the current measurement value and the corresponding measurement value).

In this case, the reference value is preferably an average value of the measurement values of the strain sensor over one past rotation immediately prior to the current angle. With this arrangement, an average value of the measurement values over one rotation is used, and therefore, all the data of the measurement values of one rotation can be taken into account, whereas in the case where the reference value is an intermediate value for example, only a measurement value at a particular rotational angle that is an intermediate value among the measurement values over one rotation is actually taken into account. As a result, the obtained error data reflects the measurement error for each rotational angle more accurately.

In the above arrangement where the error data is calculated using the current measurement value and the corresponding measurement value, the data processing unit is preferably configured to calculate the error data by subtraction between the reference value and an average value of the current measurement value and the corresponding measurement value. With this arrangement, it is possible to suppress the effect of temporal difference between the reference value, and the current measurement value and the corresponding measurement value. That is, when, for example, the reference value is the average value of the measurement values over one past rotation immediately before, the reference value corresponds, in time series, to an intermediate point between the present and the point one rotation before, and thus is delayed by half the cycle from the present. In this case, the value corresponding, in time series, to the intermediate point between the current measurement value and the corresponding measurement value can be calculated by calculating the average value of the current measurement value and the corresponding measurement value. Therefore, it is possible to suppress the temporal difference between the reference value and the average value of the current measurement value and the corresponding measurement value. Thus, even when, for example, there is a change of the jack thrust force during rotation, the effect of the change of the jack thrust force can be eliminated to calculate more accurate error data.

In the tunnel boring machine according to the one aspect, the data processing unit is preferably configured to correct the measurement data using the error data during rotation at least one rotation after the cutter head started rotating, and also configured to stop the correction of the measurement data using the error data when the cutter head has not been rotating for a prescribed amount of time or more. With this arrangement, the correction of the measurement data using the error data can be started after measurement values necessary to obtain the corresponding measurement value are obtained. When the cutter head stops rotating, it is not appropriate to correct the measurement data using the error data that is calculated using the corresponding measurement value obtained in the past rotation. Therefore, the correction of the measurement data using the error data can be stopped. In addition, it can be prevented to calculate the error data using old data that do not reflect current situation. Because the correction is stopped after a prescribed amount of time has elapsed after the cutter head stopped rotating, it can be prevented that the values of the measurement data change suddenly while the rotation is stopped.

ADVANTAGES

As described above, the present invention makes it possible to suppress the measurement error occurring along with the rotation to measure more accurately the force acting on the cutter head.

BRIEF DESCRIPTION OF THE DRAWINGS

FIG. 10 shows an example of operation of the data processing device in accordance with the calculation flow shown in FIG. 9.

FIG. 16A is a schematic longitudinal sectional view of a first variation of the tunnel boring machine according to the first embodiment. FIG. 16B is a schematic front view of a part of a first variation of the tunnel boring machine according to the first embodiment.

DESCRIPTION OF EXAMPLE EMBODIMENTS

Embodiments of the present invention will be hereinafter described with reference to the drawings.

First Embodiment

A tunnel boring machine 1 according to the first embodiment of the present invention will now be described with reference to FIGS. 1 to 10.

<Whole Configuration of Tunnel Boring Machine>

Figure 1:
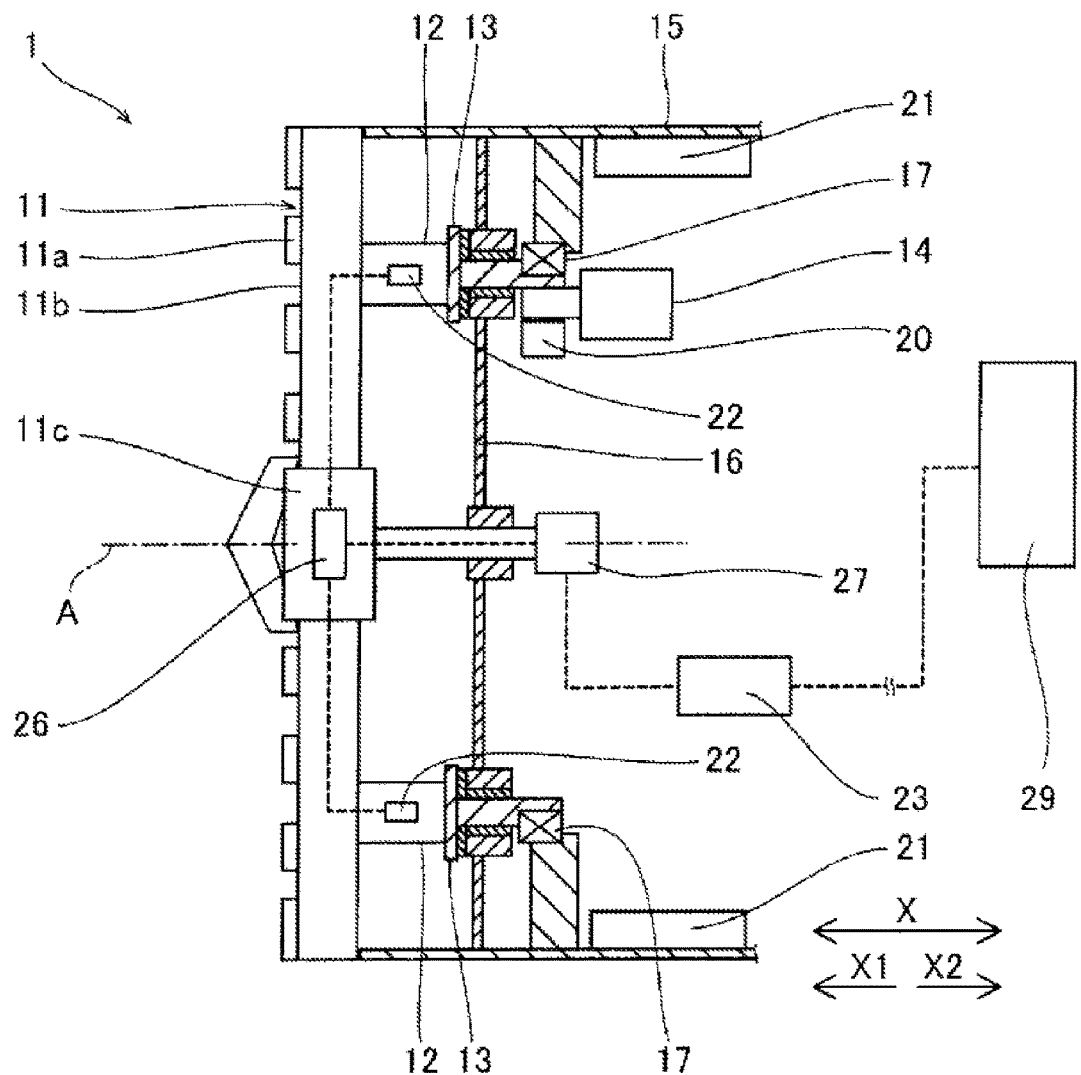
FIG. 1 is a schematic longitudinal sectional view of a tunnel boring machine according to a first embodiment of the present invention.

As shown in FIG. 1, the tunnel boring machine 1 includes a cutter head 11 that constitutes a boring surface, cutter columns 12 and a rotation base 13, and a cutter driving unit 14. In the first embodiment, the tunnel boring machine 1 has a medium to large diameter and adopts the intermediate support structure for supporting the cutter head 11. In the intermediate support structure, the cutter head 11 may be mounted to an annular rotation base 13 to be driven rotationally, via leg portions (cutter columns 12) extending in the rotation axis direction (the direction X). The rotation base 13 may be supported by a bearing 17 provided on a bulkhead 16 in a front trunk 15, so as to be rotatable around the rotation axis. The cutter column 12 is an example of "a cutter support" of the present invention.

The following description refers only to portions of the cutter head 11 and the front trunk 15 of the tunnel boring machine 1, and does not refer to other portions such as a rear trunk.

The cutter head 11 may have a circular shape (see FIG. 2) as viewed from the direction of boring, and may be configured to rotate around the rotation axis A. The cutter head 11 may have cutter bits 11a on a boring surface facing forward in the direction of boring (the direction X1). Each of a plurality of spokes 11b (see FIG. 2) arranged radially may have a plurality of cutter bits 11a mounted thereto. The material excavated by the cutter bits 11a may be moved through a through-hole to the interior of the cutter head 11, and in the case of an earth pressure shield, the material may be conveyed by a screw conveyor (not shown) to the outside of the cutter head 11. In the case of a muddy water shield, muddy water may be conveyed into a cutter chamber between the cutter head 11 and the bulkhead 16 where the excavated material may be slurried, and the slurried excavated material may be discharged through a pipe (not shown).

The cutter columns 12 may be constituted by a beam member having a hollow tubular shape and configured to support the cutter head 11 and rotate along with the cutter head 11. The cutter columns 12 may have the front (the direction X1) end thereof mounted to the spoke 11b of the cutter head 11 and the rear (the direction X2) end thereof mounted to the rotation base 13.

Figure 2:
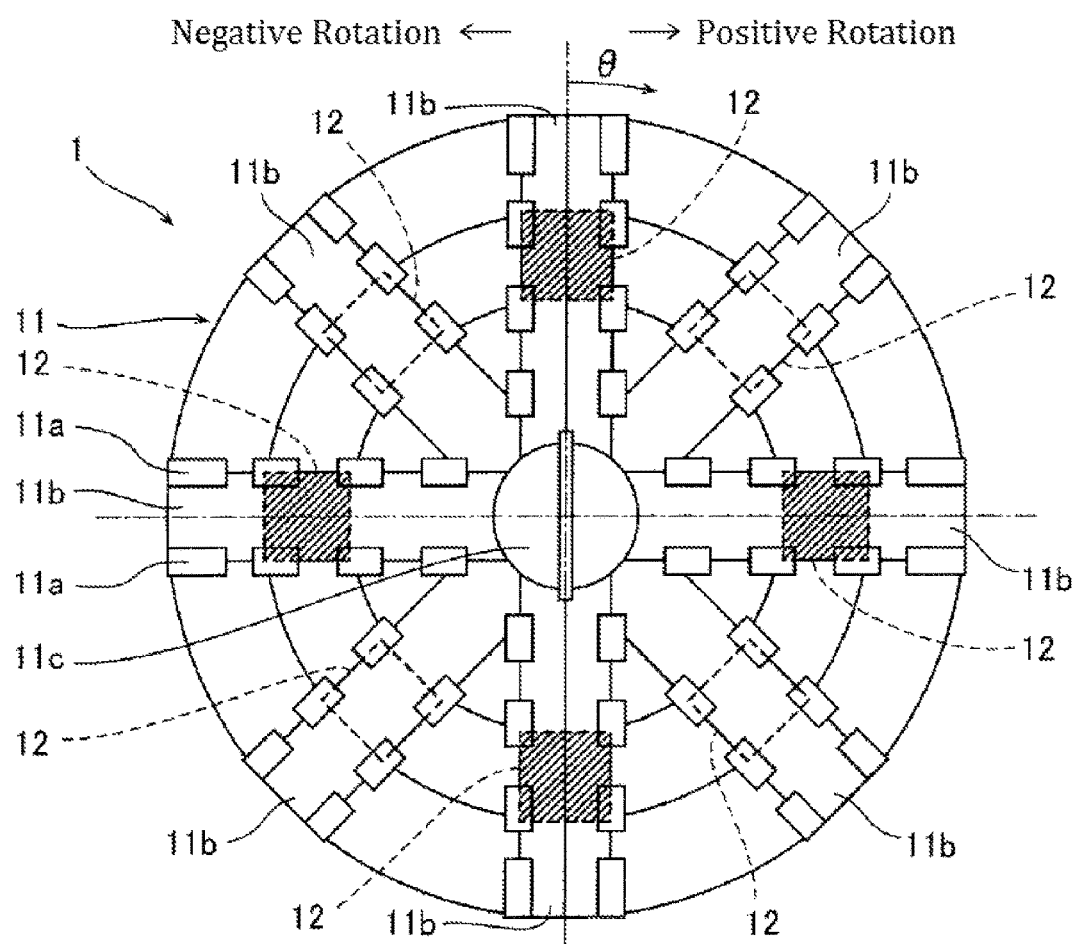
FIG. 2 is a schematic front view of the tunnel boring machine according to the first embodiment of the present invention.

As shown in FIG. 2, the cutter columns 12 may be arranged at a distance in the radial directions from the rotation axis A at regular angular intervals. More specifically, the cutter head 11 includes eight spokes 11b arranged at intervals of 45°. Each of the spokes 11b may be provided with one cutter column 12. There may be eight cutter columns 12 provided in total. Therefore, the cutter columns 12 may be arranged at regular angular intervals of 45° around the rotation axis A. The cutter columns 12 may have a prism shape.

Referring to FIG. 1 again, the rotation base 13 may have an annular shape, and may support the plurality (eight) of cutter columns 12 on the front (the direction X1) side thereof. The rotation base 13 may be supported by the bearing 17 provided on the bulkhead 16 in the front trunk 15, so as to be rotatable around the rotation axis A.

The cutter driving unit 14 may be positioned in rear (the direction X2) of the bulkhead 16 and may be configured to apply a driving torque to the rotation base 13 and rotationally drive the rotation base 13 around the rotation axis A. Thus, the cutter head 11 may be supported by the cutter columns 12 and the rotation base 13 so as to be rotatable around the rotation axis A. The cutter head 11, the cutter columns 12, and the rotation base 13 may be integrally rotated by the cutter driving unit 14. In contrast, the front trunk 15 and the bulkhead 16 may be stationary and may not be rotated.

The tunnel boring machine 1 includes a rotary encoder 20 (hereinafter referred to as "the encoder 20") configured to sense the position of the cutter head 11 in the rotational direction (the rotational angle). The encoder 20 may be provided in rear (the direction X2) of the bulkhead 16, and may be configured to sense the rotational angle of the cutter head 11 (the rotation base 13). The encoder 20 may be an absolute encoder that senses the absolute position of the rotational angle, or more specifically, it senses a rotational angle with respect to a reference position of the cutter head 11 (e.g., the position shown in FIG. 2). The encoder 20 may be an example of "a rotational angle sensing unit" of the present invention.

The tunnel boring machine 1 may be thrusted in the direction of boring (the direction X1) by the thrust force of the thrust jacks 21 provided in the front trunk 15. A plurality of thrust jacks 21 may constitute one block, and a plurality of blocks may be arranged on the substantially entire inner circumference of the front trunk 15 having a cylindrical shape. The rotational driving by the cutter driving unit 14 and the application of the jack thrust force (thrusting) by the thrust jacks 21 may be controlled independently of each other.

In the first embodiment, the tunnel boring machine 1 includes a strain sensor 22 for measuring the force acting on the cutter head 11, and a data processing device (a data processing unit) 23 for obtaining the sensing result of the strain sensor 22. The strain sensor 22 can be provided on either the cutter head 11 or the cutter columns 12. In the first embodiment, the strain sensor 22 may be provided on the cutter columns 12.

The tunnel boring machine 1 may have one or more strain sensors 22. In the first embodiment, as shown in FIG. 2, the strain sensor 22 may be provided in each of four cutter columns 12 (the crosshatched portions) arranged at about 90° intervals among the eight cutter columns 12 arranged at about 45° regular intervals. Thus, there may be four strain sensors 22.

Thus, the strain sensors 22 may be arranged so as to divide the 360° into four portions (90°), making it possible to calculate the cutter thrust force acting on the boring surface of the cutter head 11 even when the cutter head 11 is stopped. Additionally, it may also be possible to provide all of the eight cutter columns with a strain sensor.

Figure 3:
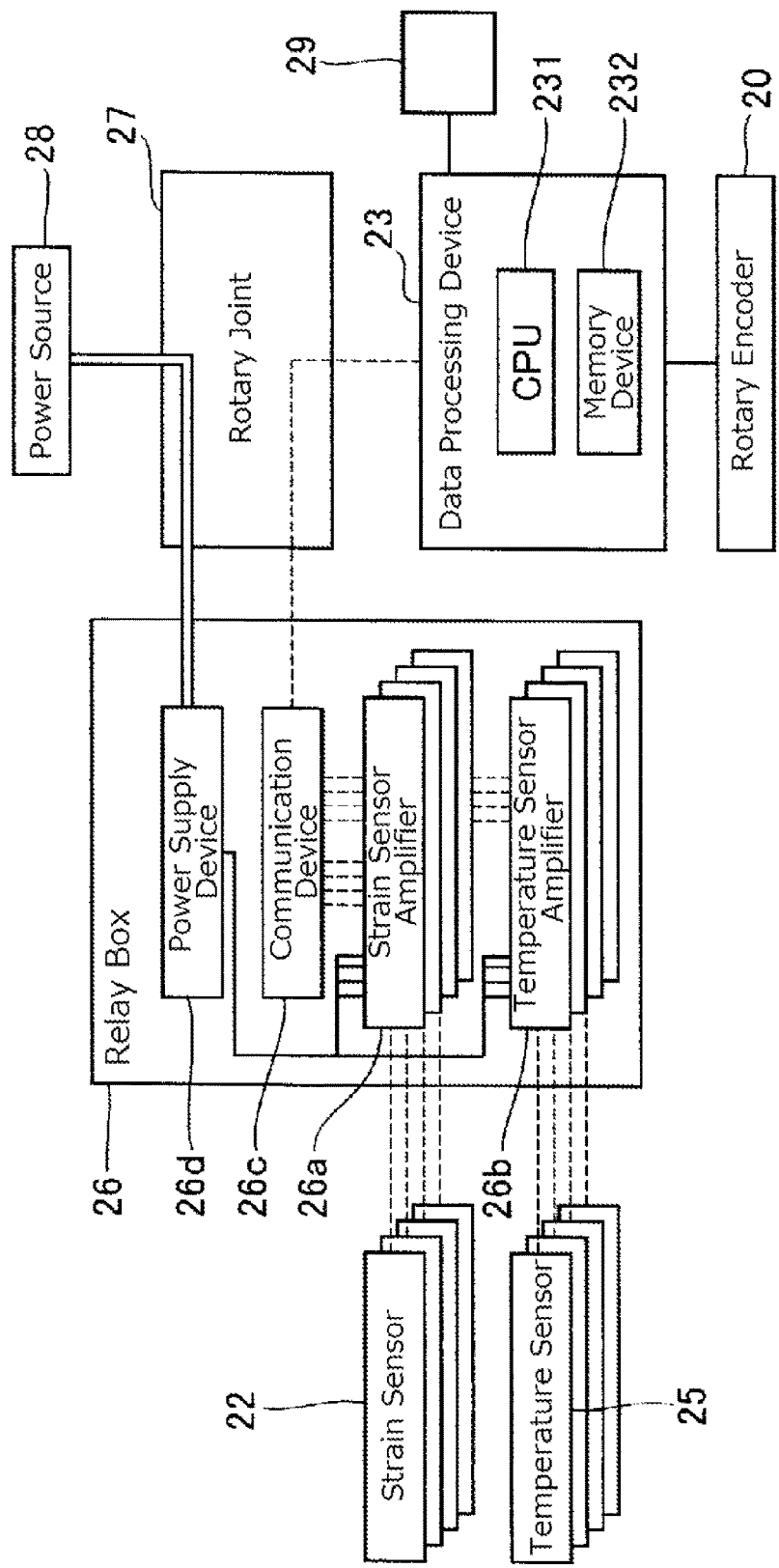
FIG. 3 is a block diagram showing a device for measuring strain.

The tunnel boring machine 1 includes a temperature sensor 25 (see FIG. 3). The temperature sensor 25 may be provided near the strain sensors 22 and sense the temperature near the strain sensors 22. The temperature sensor 25 is provided to eliminate the effect of the boring heat on the strain measurement by temperature compensation.

As shown in FIG. 1, each of the strain sensors 22 may be connected to a relay box 26 provided in a central portion 11c of the cutter head 11. As shown in FIG. 3, the relay box 26 includes amplifiers 26a for the strain sensors 22, amplifiers 26b for the temperature sensors 25, a communication device 26c, and a power supply device 26d The communication device 26c may be connected to the data processing device 23 via a rotary joint 27. The communication device 26c may convert signals outputted from the amplifiers 26a and the amplifiers 26b into sensing signals and output the sensing signals to the data processing device 23. The power supply device 26d may be connected to an external power source 28 via the rotary joint 27. The power supply device 26d may supply power to the amplifiers 26a, the amplifiers 26b, and the communication device 26c.

The data processing device 23 may be a computer including a CPU 231 and a memory device 232. The data processing device 23 may serve to obtain measurement data of the force acting on the cutter head 11 (the cutter thrust force) based on the sensing result of the strain sensors 22. The data processing device 23 may also be configured to obtain the rotational direction distribution of the forces acting on the cutter head 11 in the rotation axis direction (the direction X).

The data processing device 23 may be connected to the relay box 26 via the rotary joint 27 and may obtain the sensing signals of the strain sensors 22 from the communication device 26c of the relay box 26. The data processing device 23 may also obtain from the encoder 20 the sensing signal of the position of the cutter head 11 in the rotational direction (the current angle $\theta$). The data processing device 23 may obtain from the four strain sensors 22 the strain measurement values in the rotation axis direction at the current angle $\theta$.

Further, the data processing device 23 may obtain the sensing signals of the temperature sensors 25 from the communication device 26c of the relay box 26. The data processing device 23 may perform temperature compensation when, for example, the cutter column 12 has a temperature equal to or higher than a prescribed value. It may also be possible that the data processing device 23 constantly performs temperature compensation.

As shown in FIG. 1, the data processing device 23 may be connected to a computer in an operation room 29 of the tunnel boring machine 1 and a computer in a monitoring room (not shown) on the ground. The data processing device 23 can output the measurement data obtained.

<Outline of Operation to Obtain Measurement Data of Cutter Thrust Force>

Figure 4:
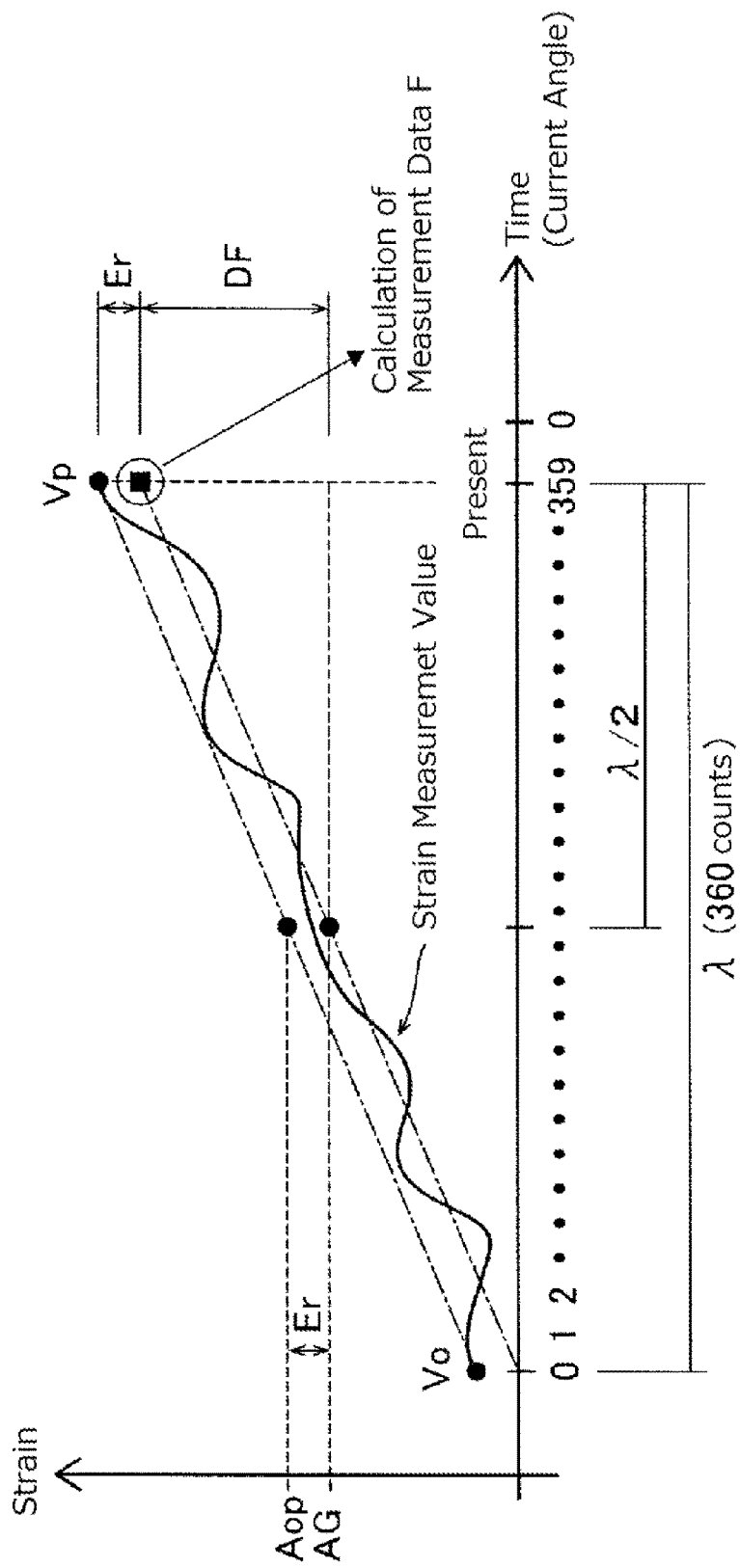
FIG. 4 schematically shows the current measurement value, the corresponding measurement value, and the error data.
Figure 5:
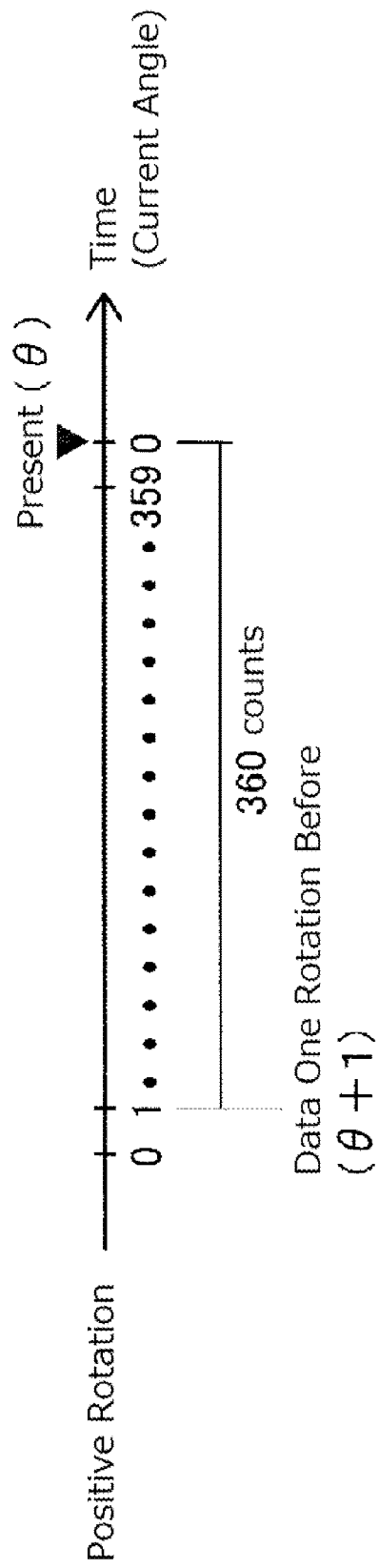
FIG. 5 shows a data array for positive rotation of the cutter head.
Figure 6:
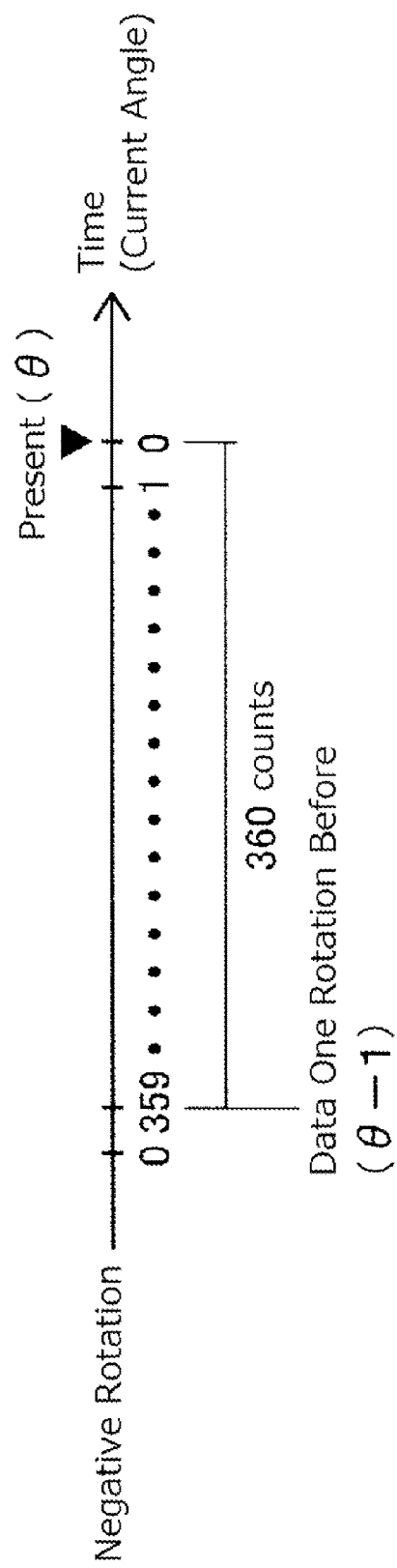
FIG. 6 shows a data array for negative rotation of the cutter head.

The operation to obtain the measurement data of the cutter thrust force will be schematically described with reference to FIGS. 4 to 6. As shown in FIG. 4, in the first embodiment, the data processing device 23 may obtain error data $E_r$ based on the current measurement value Vp of the strain sensors 22 obtained at the current angle $\theta$ of the cutter head 11 and a past corresponding measurement value Vo obtained at the rotational angle corresponding to the current angle $\theta$. The data processing device 23 may also be configured to correct the current measurement data F using the error data $E_r$.

The current angle $\theta$ is a current angle of the cutter head 11 measured with respect to a prescribed reference rotational position. The current angle $\theta$ may be obtained, for example, in units of one degree within a range from 0 to 359°. When the cutter head 11 is rotated, the current angle $\theta$ may be a function of time, and therefore, the current time may be substituted for the current angle $\theta$.

The current measurement value Vp is the current strain measurement value obtained at the current angle $\theta$. The current measurement value Vp may be the average value (sensor average value) of the strain measurement values obtained from the four strain sensors 22 at the same time (the same angle). As will be described later, it may also be possible that the current measurement value Vp is not a strain measurement value strictly at the current angle $\theta$ but a strain measurement value at a neighboring rotational angle deemed to be equivalent to the current angle $\theta$.

The corresponding measurement value Vo is a past strain measurement value corresponding to the current measurement value Vp, and may be stored on the memory device 232. The corresponding measurement value Vo may be a strain measurement value (sensor average value) obtained one rotation (360°) or a plurality of rotations prior to the current measurement value Vp. In the first embodiment, the corresponding measurement value Vo is the measurement value of the strain sensors 22 obtained one rotation prior to the current angle $\theta$.

The error data $E_r$ is data of measurement errors occurring along with the rotation of the cutter head 11. When the strain sensors 22 are provided in the rotational parts (the cutter head 11, the cutter columns 12, etc.) of the tunnel boring machine 1 for measuring strain, the strain measurement values may include error components that vary in accordance with the rotational angle shown in the horizontal axis. The error data $E_r$ may represent the error components that vary in accordance with the rotational angle and may have cyclicity. That is, the variation of the strain measurement values in one cycle (one rotation) shown in FIG. 4 may also appear in the second cycle (second rotation) and later cycles in the similar manner. FIG. 4 shows an example in which the jack thrust force of the thrust jacks 21 is increased with time. Therefore, in FIG. 4, the strain measurement value increases with time.

The data processing device 23 may be configured to calculate the error data $E_r$ using a reference value AG, the current measurement value Vp and the corresponding measurement value Vo. The reference value AG may be calculated using a plurality of measurement values over at least one past rotation.

The error data $E_r$ at a rotational angle can be evaluated to be the amount of change of the current measurement value Vp and the corresponding measurement value Vo at the rotational angle with respect to the reference value AG. The reference value AG may be calculated using, for example, measurement values between the current measurement value obtained at present and the corresponding measurement value Vo obtained in the past.

Because the error data $E_r$ is a variable component that varies in accordance with rotation, the reference value AG may preferably reflect the measurement values over at least one rotation. In the first embodiment, the reference value AG may be an average value of the measurement values of the strain sensors 22 over the one past rotation immediately prior to the current angle $\theta$. Therefore, the reference value AG may be an average value of the 360 measurement values over one rotation.

When the reference value AG is an average value for one rotation, the reference value AG may be summarized into the data at the point the half cycle ($\lambda/2$) prior to the present (the data at the intermediate point of the calculation range), in terms of a time series. Therefore, when the jack thrust force changes as shown in FIG. 4, it is necessary to take into account the amount of change DF of the jack thrust force in the half cycle.

Thus, in the first embodiment, the data processing device 23 may be configured to calculate the error data $E_r$ by subtraction between the reference value AG and the average value $A_{op}$ of the current measurement value Vp and the corresponding measurement value Vo. That is, the error data $E_r$ can be calculated by the formula $E_r = A_{op} - AG$. Thus, the error data $E_r$ may be calculated as the difference between the average value $A_{op}$ shown in FIG. 4 and the reference value AG. The current measurement value Vp and the corresponding measurement value Vo may be positioned at opposite ends of the measurement value range used for calculation of the reference value AG. Therefore, use of the average value $A_{op}$ makes it possible to coincide the time series of the reference value AG and the average value $A_{op}$, so as to calculate the error data $E_r$ with the amount of change DF of the jack thrust force excluded from the error.

Supposing that no measurement errors other than the error data $E_r$ exist, and the intact jack thrust force is reflected in the cutter thrust force acting on the cutter head 11, the error data included in the current measurement value Vp may be substantially equal to the error data included in the corresponding measurement value Vo, as shown in FIG. 4. When correction is performed by subtracting the error data $E_r$ from the current measurement value Vp, a measurement value free of measurement errors can be obtained. Thus, the corrected measurement data F of the cutter thrust force can be obtained.

Meanwhile, the cutter head 11 may perform positive rotation (e.g., clockwise rotation) and negative rotation (e.g., counterclockwise rotation). For the positive rotation shown in FIG. 5, with the current angle θ=0, the data obtained one rotation (one cycle) before may correspond to the data for the next angle (θ+1) (the data for 1°) among the data sequence from 0° to 359°. For the negative rotation shown in FIG. 6, with the current angle θ=0, the data obtained one rotation (one cycle) before may correspond to the data for the preceding angle (θ−1) (the data for 359°) among the data sequence. Therefore, the past data used as the corresponding measurement value Vo may be different depending on the rotational direction.

Different data may be used depending on the rotational direction, but in the first embodiment, the average value $A_{op}$ of the current measurement value Vp and the corresponding measurement value Vo may be calculated by Formula (1) below.

$$A_{op} = \{\text{"measurement value}(\theta+1)\text{"} + \text{"measurement value}(\theta-1)\text{"}\}/2$$

(When θ=0, θ−1=359; and when θ=359, θ+1=0)  (1)

The measurement values referred to by "measurement value (θ+1)" and "measurement value (θ−1)" may be the measurement value at the rotational angle (θ+1) and the measurement value at the rotational angle (θ−1), respectively.

In positive rotation, the measurement value (θ+1) may correspond to the past corresponding measurement value Vo obtained one rotation before, and the measurement value (θ−1) may correspond to the current measurement value Vp. Because the difference between the current angle θ and (θ−1) is sufficiently small, it is deemed that the measurement value (θ)≈the measurement value (θ−1), and the measurement value (θ−1) may be used as the current measurement value Vp.

In negative rotation, the measurement value (θ+1) may correspond to the current measurement value Vp, and the measurement value (θ−1) may correspond to the past corresponding measurement value Vo obtained one rotation before. It is deemed that the measurement value (θ)≈the measurement value (θ+1), and the measurement value (θ+1) may be used as the current measurement value Vp.

Thus, whichever the rotational direction is, any one of the measurement value (θ+1) and the measurement value (θ−1) can be deemed as the current measurement value Vp, and the other can be deemed as the corresponding measurement value Vo. Therefore, the calculation of the average value $A_{op}$ by Formula (1) above can be used uniformly irrespective of the rotational direction.

In the first embodiment, the data processing device 23 may be configured to perform the correction of the measurement data F using the error data $E_r$ during rotation at least one rotation after the cutter head 11 started rotating, and also configured to stop the correction of the measurement data F using the error data $E_r$ when the cutter head 11 has not been rotating for a prescribed amount of time or more.

The timing to start the correction after the start of rotation may be determined in accordance with the number of rotations for which the corresponding measurement value Vo is tracked back. In the first embodiment, the measurement value obtained one rotation before is used as the corresponding measurement value Vo, and therefore, the data processing device 23 may start the correction of the measurement data F using the error data $E_r$ one rotation after the start of the rotation.

The timing to stop the correction of the measurement data F while the rotation is stopped may be determined so as to cause a smaller effect of change of the measurement data F between before and after the stop of the correction. Therefore, in the first embodiment, the data processing device 23 may determine that the cutter head 11 has been stopped when there is no change of the current angle θ for a prescribed amount of time. The data processing device 23 may stop the correction using the error data $E_r$ when the cutter head 11 has not been rotating for a prescribed stop-standby time since it was determined that the cutter head 11 had been stopped. When the rotation of the cutter head 11 is resumed, the data processing device 23 may start the correction using the error data $E_r$ one rotation after the resumption of the rotation.

<Processing by Data Processing Device>

Next, the processing by the data processing device 23 of the tunnel boring machine 1 according to the first embodiment will be described with reference to FIGS. 7 to 9.

—Measurement Process

Figure 7:
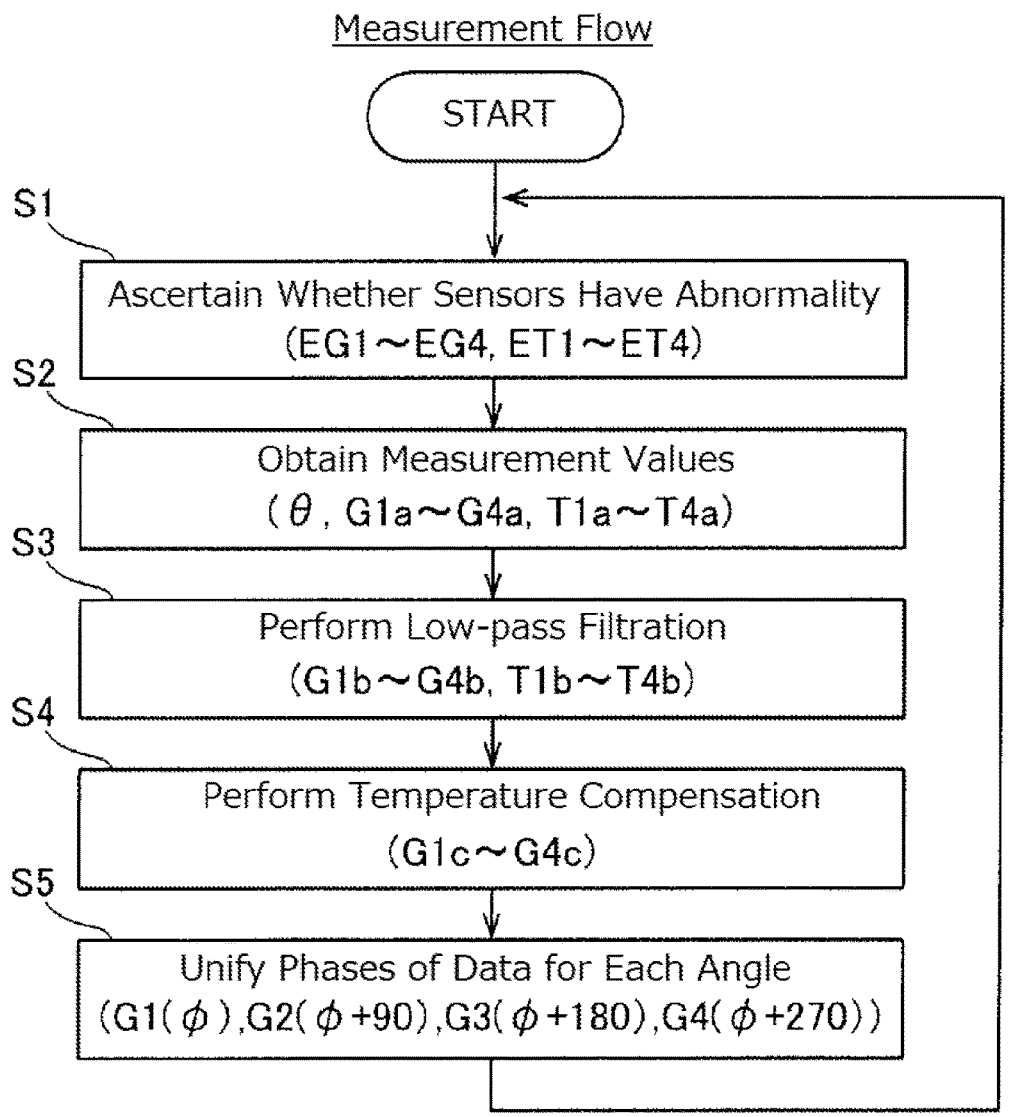
FIG. 7 is a flowchart of strain measurement performed by a data processing device of the tunnel boring machine according to the first embodiment of the present invention.

The measurement flow shown in FIG. 7 represents a process of obtaining measurement results from the strain sensors 22 for each sampling cycle (e.g., 0.1 second).

In step S1 of FIG. 7, the data processing device 23 may ascertain whether the sensors have abnormality. The data processing device 23 may detect abnormality of the strain sensors 22 and the temperature sensors 25 provided in the four cutter columns 12.

Hereinafter, the four strain sensors 22 in the cutter columns 12 will be referred to as Gage 1 to Gage 4, and the four temperature sensors 25 will be referred to as Temperature 1 to Temperature 4. For a sensor having abnormality such as disconnection or short circuit, the data processing device 23 may apply "0" to the sensing value indicating the status of the sensor, and for a sensor having no abnormality, the data processing device 23 may apply "1" to the sensing value. As a result, the sensing values EG1 to EG4 of the Gage 1 to Gage 4 and the sensing values ET1 to ET4 of the Temperature 1 to Temperature 4 (each being "0" or "1") may be obtained.

In step S2, the data processing device 23 may capture the measurement values. More specifically, the current angle θ of the cutter head 11 may be obtained from the encoder 20. In addition, strain measurement values G1a to G4a may be obtained from the strain sensors 22 as Gage 1 to Gage 4. The strain measurement values for Gage 1 to Gage 4 at the current angle θ may be obtained at phases differentiated from one another by 90° in the rotational direction. Further, the temperature measurement values T1a to T4a of the temperatures near the strain sensors 22 may be obtained from the associated temperature sensors 25 as Temperature 1 to Temperature 4. The instantaneous value at the point of sampling for each sensor may be captured as a measurement value.

In step S3, the data processing device 23 may perform the low-pass filtration on the obtained measurement values (the strain measurement values G1a to G4a and the temperature measurement values T1a to T4a) to remove high frequency components (noise). The low-pass filtration may be performed by applying a low-pass filtration function such as a moving average or a window function to the measurement value. Thus, the strain measurement values G1b to G4b and the temperature measurement values T1b to T4b subjected to the low-pass filtration may be obtained. When the noise of the measurement values is not large, the low-pass filtration is not necessary.

In step S4, the data processing device 23 may perform the temperature compensation process on the strain measurement values G1b to G4b subjected to the low-pass filtration using the temperature measurement values T1b to T4b. The temperature compensation process may be performed using a preset temperature compensation function. Thus, the strain measurement values subjected to the temperature compensation process may be obtained as G1c to G4c.

In step S5, the data processing device 23 may perform a process of coinciding the phases of the rotational angles (rearrangement of data) on the strain measurement values G1c to G4c of strain sensors 22 subjected to the temperature compensation process, so as to arrange the measurement values as data for each rotational angle with respect to a reference angle.

More specifically, the data processing device 23 may rearrange the strain measurement values G1c to G4c of the Gage 1 to Gage 4 subjected to the temperature compensation process, currently obtained at the current angle θ, as the data for four rotational angles φ, as follows.

$$G1(\varphi)=G1c$$

$$G2(\varphi+90)=G2c$$

$$G3(\varphi+180)=G3c$$

$$G4(\varphi+270)=G4c$$

This rearrangement process uses a rotational angle φ (φ=0° to 359°) for convenience, the rotational angle φ being independent of time, unlike the current angle θ being the rotational angle of the cutter head 11 at the present.

As a result, when the measurement is performed while rotating the cutter head 11, one rotation of the cutter head 11 may produce four strain measurement values G1(φ) to G4(φ) in association with any rotational angle φ. For the cutter thrust force acting on the cutter head 11 at the present, the measurement values G1c to G4c obtained at the present angle θ should be taken into account. For the forces acting on the cutter head 11 for each rotational angle (the rotational angle distribution of the forces), G1(φ) to G4(φ) substituting the rotational angle φ should be taken into account.

The above measurement flow may be looped for each sampling cycle to sequentially obtain strain measurement values for each rotational angle.

<Operation Process>

Figure 8:
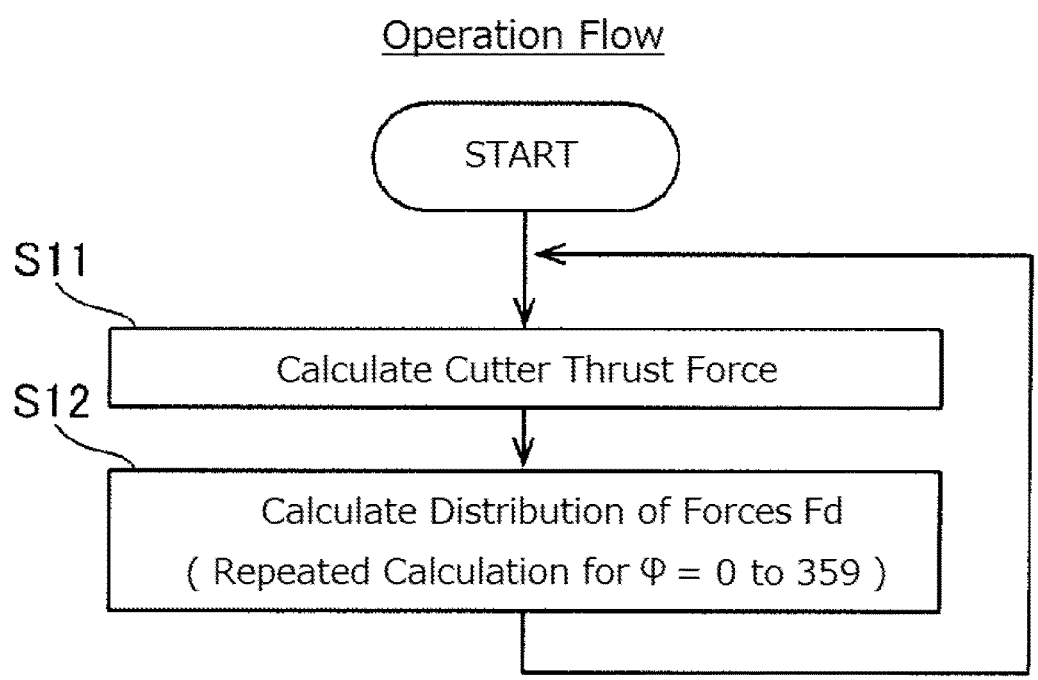
FIG. 8 is a flowchart of operation performed by a data processing device of the tunnel boring machine according to the first embodiment of the present invention.

The operation flow shown in FIG. 8 represents a process of calculating the force acting on the cutter head 11 (the cutter thrust force) and the rotational angle distribution of the forces from the strain measurement values for each prescribed cycle (e.g., one second).

In step S11 of FIG. 8, the data processing device 23 may calculate the measurement data F of the force (the cutter thrust force) acting on the cutter head 11. The calculation of the cutter thrust force may be performed in the calculation flow (the subroutine) shown in FIG. 9.

Figure 9:
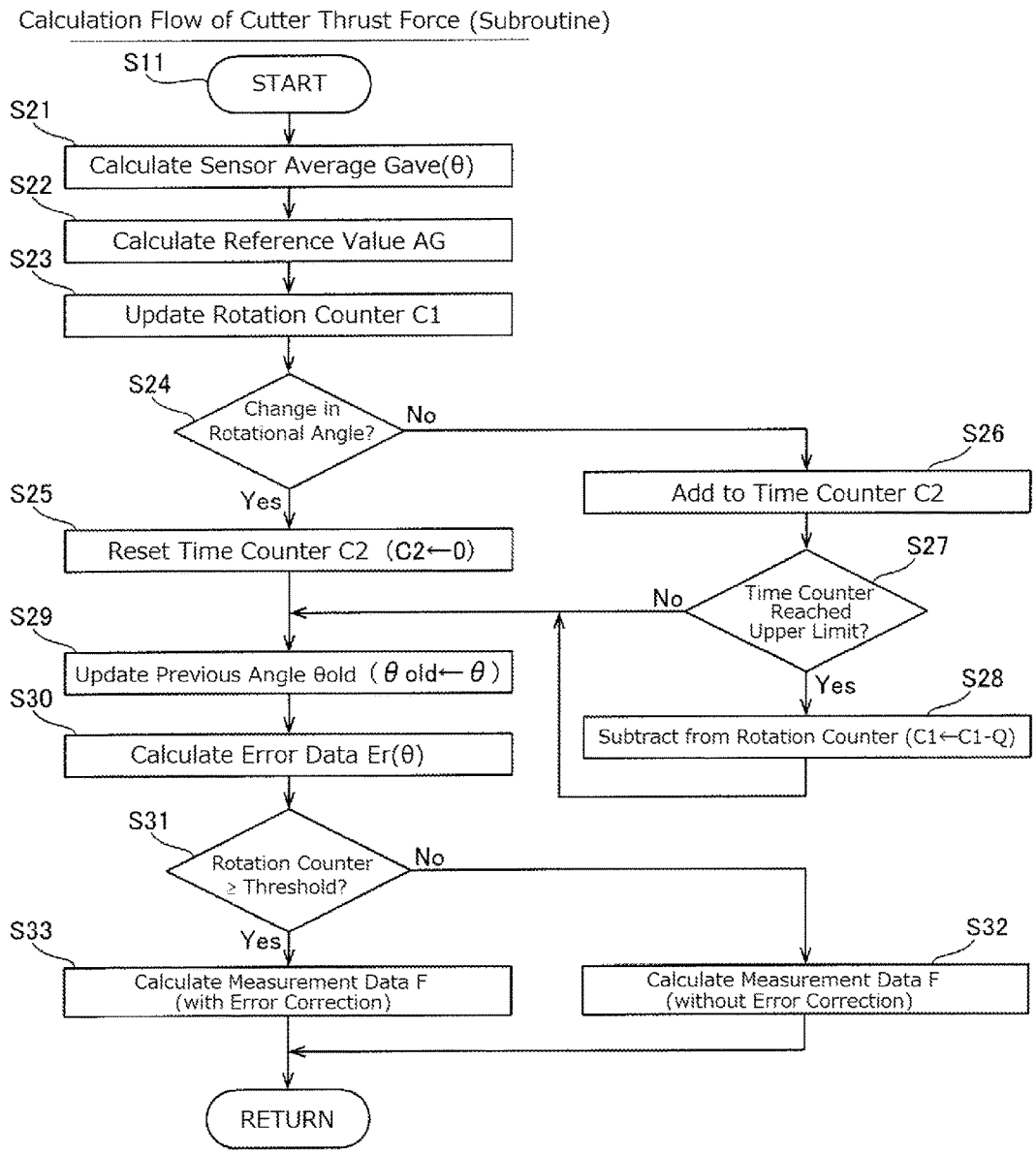
FIG. 9 is a flowchart (subroutine) of calculation of the cutter thrust force in the operation flow shown in FIG. 8.

First, in step S21 of FIG. 9, the data processing device 23 may calculate the sensor average value $G_{ave}(\theta)$ of the measurement values at the current angle θ. The sensor average value $G_{ave}(\theta)$ may be an average value of the measurement values G1c to G4c of the four strain sensors 22 obtained at the present (the current angle θ).

The sensor average value $G_{ave}(\theta)$ may be expressed by Formula (2) below.

$$G_{ave}(\theta)=(G1c \times EG1+G2c \times EG2+G3c \times EG3+G4c \times EG4)/(EG1+EG2+EG3+EG4) \quad (2)$$

$G_{ave}(\theta)$ is an average of the strain measurement values obtained from Gage 1 to Gage 4 that were determined to be in a normal state by ascertaining the presence of abnormality. Therefore, when only Gage 4 is determined to be in an abnormal state in step S1 of FIG. 7 (EG4="0"), the average of the three strain measurement values of the Gages other than Gage 4 which is determined to be in an abnormal state may be calculated. The data processing device 23 may store the obtained sensor average value $G_{ave}(\theta)$ in the memory device 232.

In step S22, the data processing device 23 may calculate the average value (the reference value AG) of the measurement values of one rotation (360°) immediately prior to the current angle θ and store it in the memory device 232. The reference value AG may be expressed by Formula (3) below.

$$AG=\Sigma G_{ave}(\theta)/360 \quad (3)$$

In step S23, the data processing device 23 may update the value of a rotation counter C1. The rotation counter C1 may count the accumulated rotational angle from the start of the rotation to the present until it reaches the upper limit value. After start of the rotation, the rotation counter C1 may count the rotational angle to determine whether the cutter head 11 has made one rotation and also count (count down) the stop-standby time for stopping the measurement data correction. In the first embodiment, these two determinations may be made using the common rotation counter C1.

The upper limit value of the rotation counter C1 may be set at 720)(°. In step S23, the absolute value of the difference between the angle for the previous calculation (the previous angle $\theta_{old}$) and the current angle θ at the present ($|\theta_{old}-\theta|$) may be added to the rotation counter C1 (C1=C1+$|\theta_{old}-\theta|$). When the rotation counter C1 has reached the upper limit value, the count may remain the upper limit value (720).

In step S24, the data processing device 23 may determine whether there is a change in the rotational angle of the cutter head 11. The data processing device 23 may determine that there is a change in the rotational angle when $|\theta_{old}-\theta|>0$, and it determines that there is no change in the rotational angle when $|\theta_{old}-\theta|=0$.

When the data processing device 23 determines that there is a change in the rotational angle of the cutter head 11, the data processing device 23 may reset a time counter C2 at 0 (C2=0) in step S25. The data processing device 23 may then proceed to step S29. When it is determined that there is no change in the rotational angle of the cutter head 11, the time counter C2 may count the stop-continuing time until it reaches the upper limit value at which it is determined that the cutter head 11 has been stopped. The upper limit value of the time counter C2 may be set at 10 (seconds).

In contrast, when the data processing device 23 determines in step S24 that there is no change in the rotational angle of the cutter head 11, the data processing device 23 may add the elapsed time to the value of the time counter C2 (C2=C2+the elapsed time) in step S26. The elapsed time may start when the operation process was performed previously. Because the operation flow is performed on one-second cycle, the elapsed time to be added may be 1 (second). When the time counter C2 has reached the upper limit value, the count may remain the upper limit value (10 seconds).

In step S27, the data processing device 23 may determine whether the value of the time counter C2 is the upper limit value (10 seconds). When the upper limit value is not reached, the data processing device 23 may proceed to step S29.

When the upper limit value is reached, the data processing device 23 may subtract a prescribed subtraction amount Q from the value of the rotation counter C1 (C1=C1−Q) in step S28. When the subtraction results in C1<0, C1 is set at 0.

The subtraction amount Q may be set in accordance with the stop-standby time from when the time counter C2 reaches the upper limit value until the correction of the measurement data F is stopped. In the first embodiment, the subtraction amount Q may be set at 60. The specific relationship between the change of the rotation counter C1 and the time counter C2 and the correction of the measurement data will be described later.

After subtraction from the value of the rotation counter C1, the data processing device 23 may proceed to step S29. In step S29, the data processing device 23 may update the value of the previous angle $\theta_{old}$ with the value of the current angle $\theta$ at the present ($\theta_{old}=\theta$), for the next operation process.

In step S30, the data processing device 23 may calculate the error data $E_r(\theta)$. The error data $E_r(\theta)$ may be expressed by Formula (4) below.

$$E_r(\theta)=\{G_{ave}(\theta-1)+G_{ave}(\theta+1)\}/2-AG$$

(When $\theta=0$, $\theta-1=359$; and when $\theta=359$, $\theta+1=0$) (4)

Formula (4) above may be the same as Formula (1) above. In the right side of Formula (4), one of $G_{ave}(\theta-1)$ and $G_{ave}(\theta+1)$ may correspond to the current measurement value Vp and the other may correspond to the corresponding measurement value Vo. The value of $\{G_{ave}(\theta-1)+G_{ave}(\theta+1)\}/2$ may be the average value $A_{op}$ described above.

Next, in step S31, the data processing device 23 may determine whether the value of the rotation counter C1 is equal to or greater than a correction performing threshold value. The correction performing threshold value may be set at 360 (°) corresponding to one rotation of the cutter head 11.

When the value of the rotation counter C1 is less than the correction performing threshold value, the data processing device 23 may proceed to step S32 and calculate the measurement data F of the cutter thrust force. In step S32, the data processing device 23 does not perform the correction using the error data $E_r$, but may calculate the measurement data F by Formula (5) below using the sensor average value $G_{ave}(\theta)$.

$$F=K \times G_{ave}(\theta)$$  (5)

K is a coefficient for converting strain into the thrust force (stress).

When the value of the rotation counter C1 is equal to or greater than the correction performing threshold value, the data processing device 23 may proceed to step S33 and correct the measurement data F of the cutter thrust force using the error data $E_r(\theta)$. The data processing device 23 may calculate the measurement data F by Formula (6) below.

$$F=K \times \{G_{ave}(\theta)-E_r(\theta)\}$$  (6)

When the measurement data F is calculated in step S32 or step S33, the calculation process of the cutter thrust force in step S11 is completed. Referring back to FIG. 8, the data processing device 23 may proceed to step S12.

In step S12 of FIG. 8, the data processing device 23 may calculate the rotational angle distribution $Fd(\varphi)$ of the forces acting on the cutter head 11 for each rotational angle $\varphi$.

The force $Fd(\varphi)$ for a rotational angle $\varphi$ can be expressed by Formula (7) below.

$$Fd(\varphi)=K \times G_{ave}(\varphi)$$

$$G_{ave}(\varphi)=(G1(\varphi) \times EG1+G2(\varphi) \times EG2+G3(\varphi) \times EG3+G4(\varphi) \times EG4)/(EG1+EG2+EG3+EG4) \quad (7)$$

$G_{ave}(\varphi)$ is the average of the strain measurement values for the same rotational angle $\varphi$ obtained in step S5 of FIG. 7. The data processing device 23 may repeatedly calculate the force $Fd(\varphi)$ for the rotational angle $\varphi$ ranging from 0 to 359 to obtain the rotational direction distribution of the forces acting on the cutter head 11.

The above operation flow may be looped for a prescribed cycle to obtain the measurement data $F(\theta)$ of the cutter thrust force at each time (each current angle $\theta$) and the rotational direction distribution $Fd(\varphi)$ of the forces acting on the cutter head 11 for each rotational angle $\varphi$.

<Example of Processing by Data Processing Device>

Next, an example of processing by the data processing device 23 during operation of the tunnel boring machine 1 will be described with reference to FIG. 10. FIG. 10 shows an imaginary example of processing for explanation in time series, in which the cutter head 11 rotates by 1° each second and it makes only the positive rotation (advancing from 0° to 359°).

After the rotation is started at time 0 (second), the current angle $\theta$ may advance. In the example shown in FIG. 10, $|\theta_{old}-\theta|=1°$, and therefore, the value of the rotation counter C1 may be incremented by one each second. During rotation ($|\theta_{old}-\theta|>0$), the value of the time counter C2 may be reset at 0.

The correction using the error data $E_r$ is not performed until the rotation counter C1 reaches the correction performing threshold value (360) corresponding to one rotation. Thus, in the first rotation after start of the operation, the measurement data F may be calculated by Formula (5) above without error correction.

When the rotation counter C1 reaches the correction performing threshold value (360), the measurement data F including the error correction using the error data $E_r$ may be calculated. Specifically, the measurement data F may be calculated by Formula (6) above using the error data $E_r$. Because the value of the current angle θ ranges from 0 to 359, the current angle θ returns to 0 after 360 seconds.

After the rotation counter C1 reaches the upper limit value (720), the rotation counter C1 may remain the upper limit value (720) while the rotation continues.

The cutter head 11 then stops rotating at time T0 (the current angle θ=N°) Because $|θ_{old}-θ|=0$ after time T0, the time counter C2 may be incremented in units of one second. The rotation counter C1 is not incremented, and therefore, the rotation counter C1 may remain the upper limit value (720).

At time T10, ten seconds after stopping, the time counter C2 reaches the upper limit value (10), and it may remain the upper limit value while the rotation is stopped. Because the time counter C2 reached the upper limit value, the subtraction amount Q (=60) may be subtracted from the rotation counter C1 in each operation cycle.

Even when the rotation is stopped continuously, the corrected measurement data F may be calculated by Formula (6) above while the rotation counter C1 is equal to or greater than the correction performing threshold value (360). At time U6, six seconds after the time counter C2 reached the upper limit value, the rotation counter C1 (=300) falls below the correction performing threshold value (360), and the error correction using the error data $E_r$ may be stopped. That is, after time U6, the measurement data F may be calculated by Formula (5) above without the correction.

Thus, the subtraction amount Q may serve to set the length of the stop-standby time from the point when the data processing device 23 determines that the cutter head 11 has been stopped until the correction using the error data $E_r$ is stopped. When Q=60, the stop-standby time is six seconds. The length of the stop-standby time (the size of the subtraction amount Q) may be set appropriately in accordance with the rated rotation speed of the cutter head 11 or the like.

The rotation counter C1 is decremented in units of the subtraction amount Q (60), and at time U12, the rotation counter C1<0. Thereafter the value of the rotation counter C1 may remain 0.

Then, at time V1, rotation of the cutter head 11 is restarted. Because $|θ_{old}-θ|=1$, the rotational angle θ=N+1, and the rotation counter C1=1. In addition, because there is a change in angle ($|θ_{old}-θ|>0$), the time counter C2 may be reset at 0.

As a result of the operation described above, the error correction of the measurement data F using the error data $E_r$ may be performed in a time period from the point one rotation after the start of the rotation to the point when the stop-standby time (six seconds) has elapsed after it is determined that the rotation has been stopped (time T10) (the time period from time 360 to time U8). The error correction using the error data $E_r$ may be stopped during one rotation from the start of the rotation (from time 0 to time 359) and after the stop-standby time elapsed after it is determined that the rotation has been stopped (after time U6).

<Advantageous Effects of First Embodiment>

The first embodiment provides the following advantageous effects.

As described above, in the first embodiment, the data processing device 23 may be configured to obtain error data $E_r$ based on the current measurement value Vp of the strain sensors 22 obtained at the current angle θ of the cutter head 11 and a past corresponding measurement value Vo obtained at a rotational angle corresponding to the current angle θ, thereby to correct the current measurement data F using the error data $E_r$. Thus, it is possible to correct the measurement data F of the forces acting on the cutter head 11 with the error component occurring along with the rotation, taking advantage of the cyclicity of the measurement error occurring along with the rotation. As a result, it is possible to suppress the measurement error occurring along with the rotation to measure more accurately the thrust force acting on the cutter head 11 (the measurement data F).

As described above, in the first embodiment, the corresponding measurement value Vo may be the measurement value of the strain sensors 22 obtained one rotation prior to the current angle θ. Thus, the error data $E_r$ can be obtained based on the most recent corresponding measurement value Vo obtained one rotation before. Therefore, there is less effect of change of situation between the current time and the point when the corresponding measurement value Vo was obtained (the change of the jack thrust force and the change of situation of the natural ground), as compared to the case where an older corresponding measurement value obtained a plurality of rotations before is used. As a result, the obtained error data $E_r$ more accurately reflects the measurement error occurring along with the rotation, and therefore, more accurate correction is possible with the measurement error occurring along with the rotation.

As described above, in the first embodiment, the data processing device 23 may be configured to calculate the error data $E_r$ using a reference value AG, the current measurement value Vp and the corresponding measurement value Vo. The reference value AG may be calculated using a plurality of measurement values over one past rotation. Thus, use of the measurement values over one past rotation makes it possible to obtain a reference value sufficiently reflecting the cyclicity of the measurement error occurring along with the rotation. Further, the error data $E_r$ reflecting the measurement error occurring along with the rotation can be readily obtained by evaluating the difference between the reference value AG and the measurement values at the current rotational angle (the current measurement value Vp and the corresponding measurement value Vo).

As described above, in the first embodiment, the reference value AG may be an average value of the measurement values of the strain sensors 22 over the one past rotation immediately prior to the current angle θ. Thus, all the data of the measurement values over one rotation can be taken into account, whereas in the case where the reference value AG is an intermediate value for example, only a particular measurement value that is an intermediate value among the measurement values over one rotation is taken into account. As a result, the obtained error data $E_r$ reflects the measurement error for each rotational angle more accurately.

As described above, in the first embodiment, the data processing device 23 may be configured to calculate the error data $E_r$ by subtraction between the reference value AG and the average value $A_{op}$ of the current measurement value Vp and the corresponding measurement value Vo. Thus, the time series of the reference value AG and the average value $A_{op}$ of the current measurement value Vp and the corresponding measurement value Vo can be coincided. As a result, the calculated error data $E_r$ can be more accurate, being free of impact during rotation such as change of jack thrust force.

As described above, in the first embodiment, the data processing device 23 may be configured to perform the correction of the measurement data F using the error data $E_r$ during rotation one rotation after the cutter head 11 started rotating, and also configured to stop the correction of the measurement data F using the error data $E_r$ when the cutter head 11 has not been rotating for a prescribed stop-standby time or more. Thus, the correction of the measurement data F using the error data $E_r$ can be started after measurement values necessary to obtain the corresponding measurement value Vo are obtained. In addition, even when the cutter head 11 stops rotating, it can be prevented to calculate the error data $E_r$ using old data that do not reflect current situation. Also, because the correction is stopped after the stop-standby time has elapsed, it can be prevented that the values of the measurement data F change suddenly while the rotation is stopped.

<Description of Result of Experiment>

Next, the result of the demonstration experiment performed on the tunnel boring machine 1 according to the first embodiment will be described with reference to FIGS. 11 to 15. The demonstration experiment was performed when the tunnel boring machine 1 not situated underground is started, so as to accurately calculate the cutter thrust force acting on the cutter head 11 from the jack thrust force of the thrust jacks 21, with the friction force produced by the weight of the tunnel boring machine 1 measured previously for correction. The cutter thrust force calculated from the jack thrust force was compared with strain measurements of the cutter columns 12 obtained concurrently.

Figure 11:
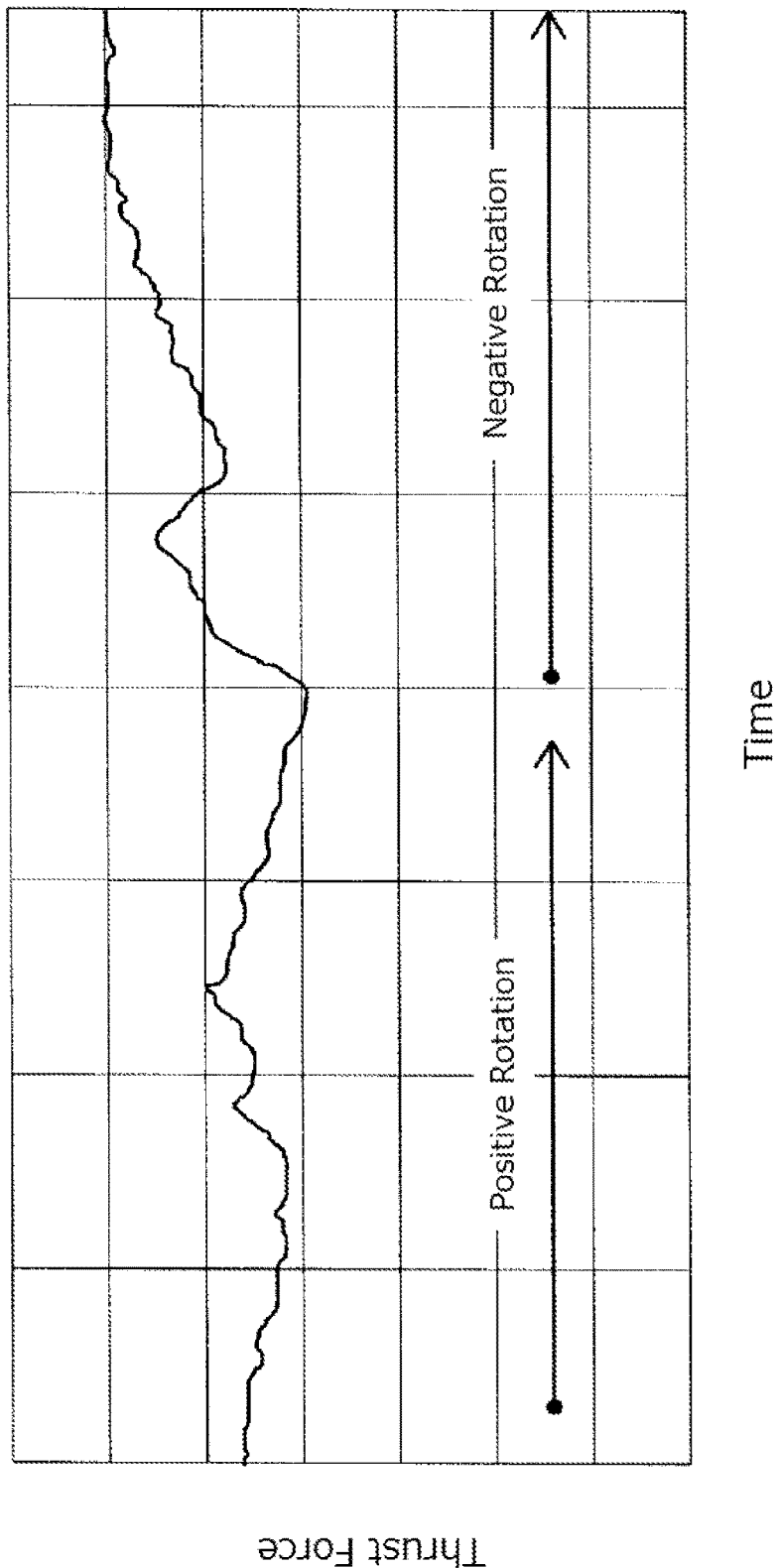
FIG. 11 is a graph showing time variation of the cutter thrust force obtained from a jack thrust force.
Figure 12:
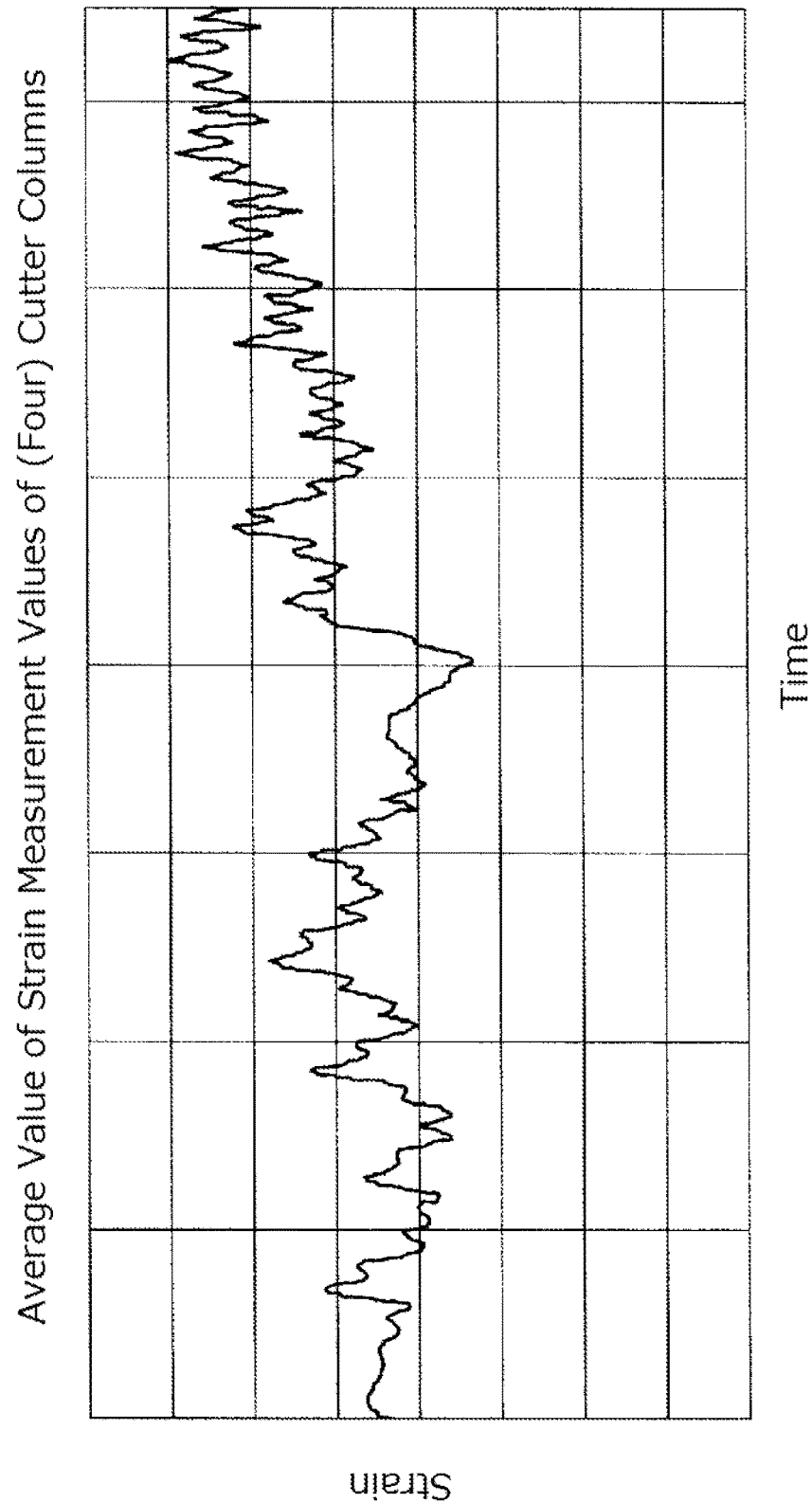
FIG. 12 is a graph showing a measurement result of strain of cutter columns obtained during measurement of the cutter thrust force shown in FIG. 11.

FIG. 11 shows time variation of the cutter thrust force which was calculated from the thrust force of the thrust jacks 21. In the measurement, the jack thrust force of the thrust jacks 21 was varied with time, and the rotation direction of the cutter head 11 was switched between the positive rotation and the negative rotation. FIG. 12 shows time variation of the measurement values (the sensor average value $G_{ave}(\theta)$) obtained from the strain sensors 22 provided in the four cutter columns 12.

Figure 13:
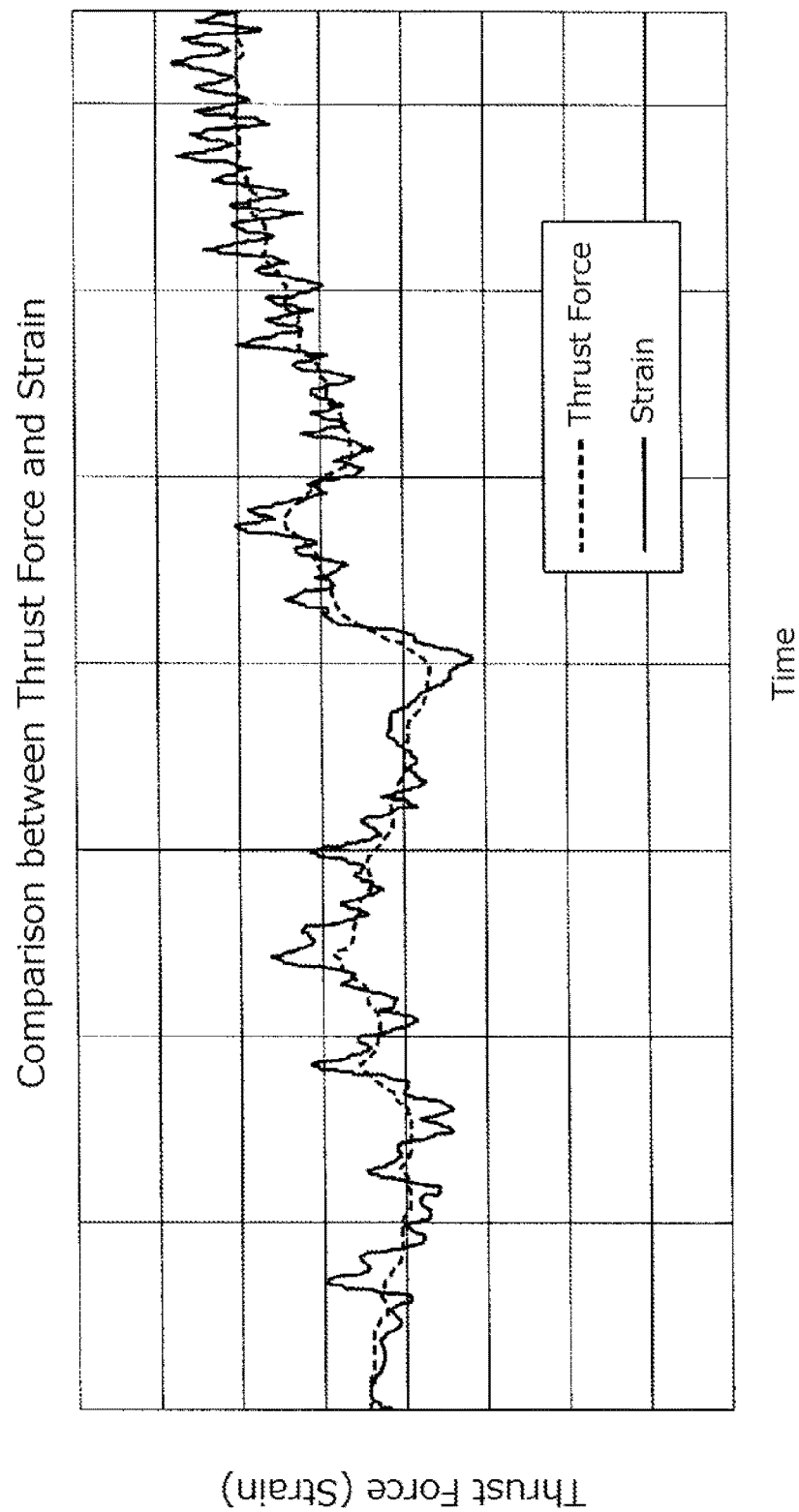
FIG. 13 is a graph showing the cutter thrust force of FIG. 11 and the measurement result of strain of FIG. 12 that are superposed one upon another.

FIG. 13 is a graph showing the measurement result obtained from the strain sensors 22 shown in FIG. 12 and the cutter thrust force calculated from the thrust force of the thrust jacks 21 (see FIG. 11) that are superposed one upon another. The correction using the error data $E_r$ is not performed. FIG. 13 shows that the strain measurement values obtained from the strain sensors 22 include small variations as compared to the cutter thrust force calculated from the thrust force of the thrust jacks 21.

Figure 14:
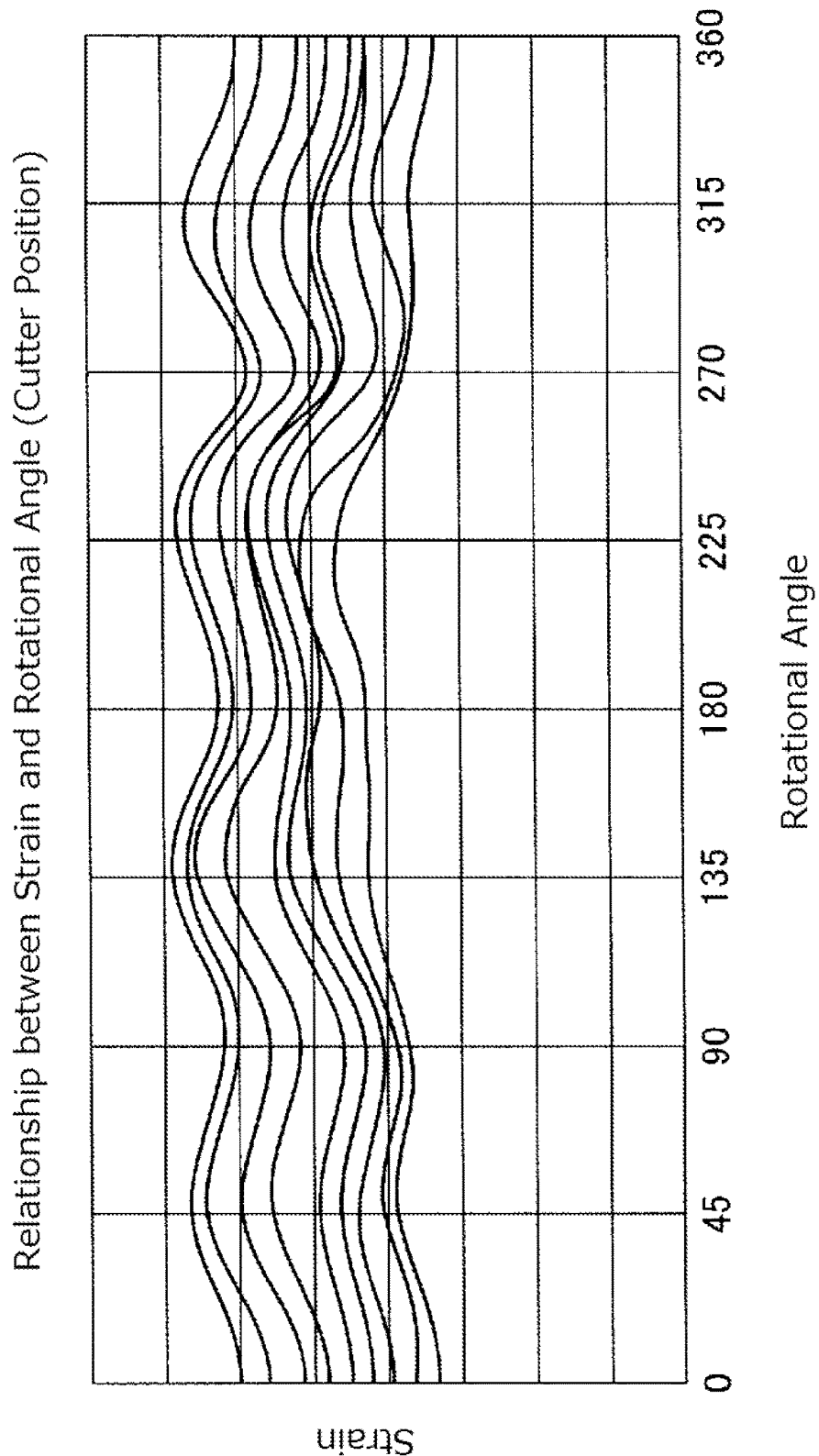
FIG. 14 is a graph showing the relationship between the measurement result of strain of FIG. 12 and the rotational angle.

FIG. 14 is a graph showing the result of switching the horizontal axis of the measurement result of the strain of the cutter columns 12 shown in FIG. 12 from the time axis to the rotational angle (cutter position) axis. One plotted line represents measurement values over one rotation, and a plurality of plotted lines are shown for a plurality of rotations. The differences between the plotted lines in the direction of vertical axis are caused by the difference of the jack thrust force between rotation cycles. Comparison between the plotted lines shows that the measurement values commonly include cyclic variation in accordance with the rotational angle. This indicates that the strain measurement values of the cutter columns 12 include cyclic measurement error occurring along with the rotation.

Figure 15:
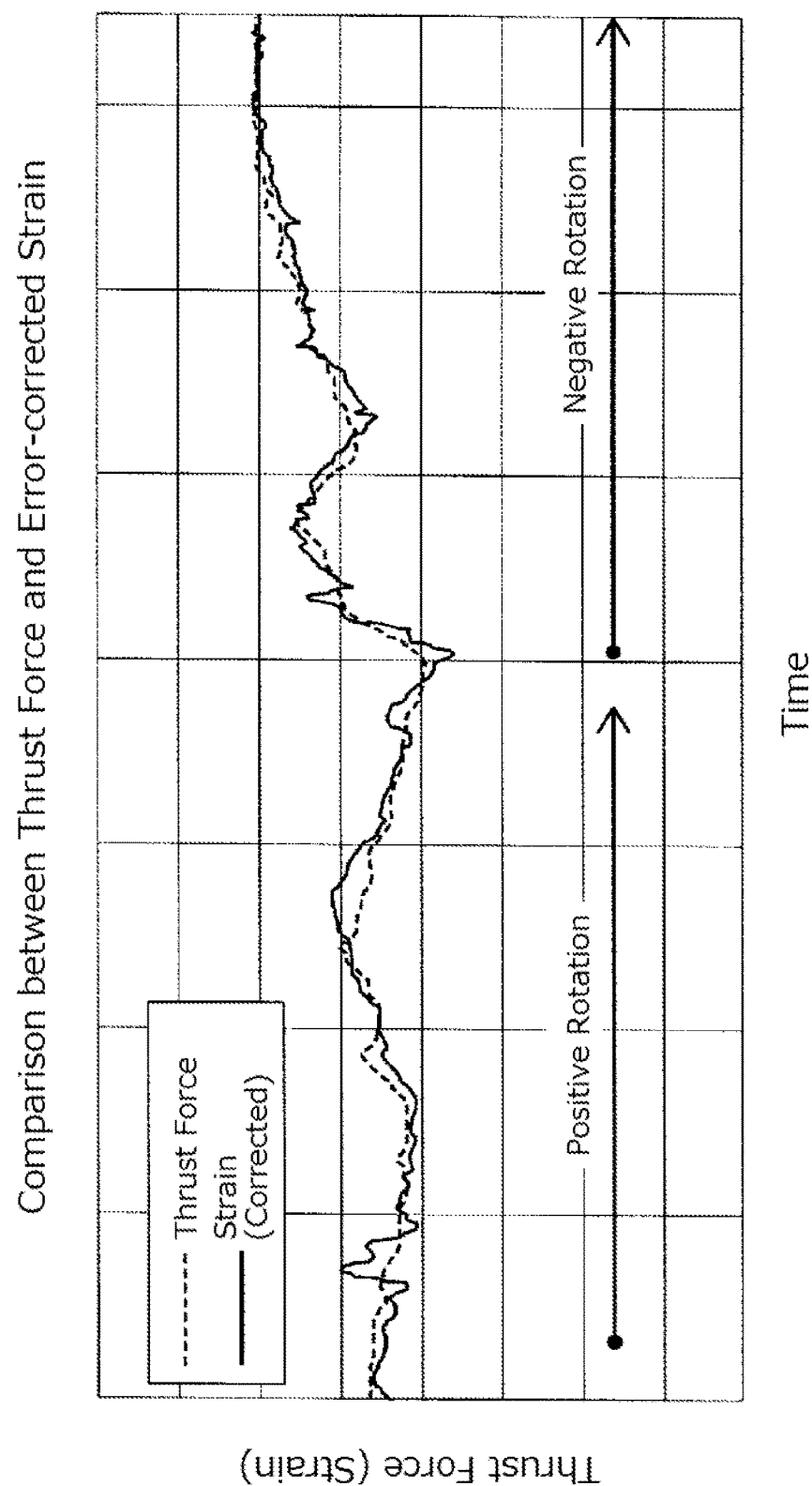
FIG. 15 is a graph showing the cutter thrust force of FIG. 11 and the error-corrected measurement result of strain that are superposed one upon another.

FIG. 15 is a graph showing the strain measurement value $(G_{ave}(\theta)-E_r(\theta))$ obtained by correcting the strain measurement result of FIG. 12 using the error data $E_r$ in the right side of Formula (6) above, and the cutter thrust force (see FIG. 11) calculated from the thrust force of the thrust jacks 21, that are superposed one upon another. As compared to the strain measurement values (the sensor average value $G_{ave}(\theta)$) prior to the correction shown in FIG. 13, the strain measurement values corrected using the error data $E_r$ is free of cyclic variation and accurately coincide with the measurement result of the cutter thrust force calculated from the thrust force of the thrust jacks 21.

Thus, in the first embodiment, it was confirmed that correction using the error data $E_r$ makes it possible to suppress the measurement error occurring along with the rotation of the cutter head 11 and measure more accurately the cutter thrust force acting on the cutter head 11.

Second Embodiment

Next, the method of calculating the error data $E_r$ according to the second embodiment of the present invention will be hereinafter described. In the second embodiment, another method of calculating the error data $E_r$ will be described, which is different from that of the first embodiment in which the error data $E_r$ is calculated by Formula (6) above. The second embodiment is the same as the first embodiment except for the calculation method of the error data $E_r$, and therefore, the description will be focused on the calculation method of the error data $E_r$.

<Method of Calculating Error Data>

In the second embodiment, the error data $E_r$ may be calculated by Formula (8) below.

$$E_r(\theta)=m \times E_r(\theta_{old})+(1-m) \times [\{G_{ave}(\theta-1)+G_{ave}(\theta+1)\}/2-AG]$$

(When $\theta=0$, $\theta-1=359$; and when $\theta=359$, $\theta+1=0$) (8)

The coefficient m is a weight coefficient of the error data $E_r$ calculated previously (currently recorded as the most recent value), and is set at an appropriate value within the range of 0<m<1 in accordance with the actual use situation.

In Formula (8) above, the error value $E_r(\theta_{old})$ calculated previously is taken into account in addition to the error $\{G_{ave}(\theta-1)+G_{ave}(\theta+1)\}/2-AG$ that is calculated currently, and these error values are individually weighed. In this case, step S29 and step S30 in the flow shown in FIG. 9 may be interchanged such that the error data $E_r$ is calculated before the previous angle $\theta_{old}$ is updated.

<Advantageous Effects of Second Embodiment>

In the second embodiment, it is also possible as in the first embodiment to correct the current measurement data F using the error data $E_r$ calculated based on the current measurement value Vp and the corresponding measurement value Vo, so as to suppress the measurement error occurring along with the rotation and measure more accurately the thrust force (the measurement data F) acting on the cutter head 11.

Further, as described above, in the second embodiment, the error data $(E_r(\theta_{old}))$ calculated previously is taken into account in addition to the error calculated at the current angle $\theta$, thereby to calculate the error data $E_r$. Thus, the calculated error data $E_r$ has a delayed value, and therefore, when the strain measurement values of the strain sensors 22 have abnormality caused by noises or the like, sudden change of the measurement data F can be moderated.

The embodiments disclosed above are mere examples in all respects, and the invention is not limited to these embodiments. The scope of the present invention will be defined by the appended claims, not by the above-described embodiments. Further, it is intended to cover all the modifications (variations) and equivalent arrangements that are within the spirit and scope of the appended claims.

For example, the first and second embodiments are examples of a tunnel boring machine having the intermediate support structure, but the present invention is not limited to these examples. The tunnel boring machine of the present invention can be applied to tunnel boring machines having other various support structures such as outer circumference support structure, center support structure, and eccentric multiaxial support structure.

In the first and second embodiments, the strain sensors 22 may be provided in the cutter columns 12 of the tunnel boring machine 1, but the present invention is not limited to this example. In the present invention, it may also be possible that the strain sensors are provided in elements other than the cutter columns.

For example, the first variation shown in FIGS. 16A and 16B employs center shaft support structure for supporting the cutter head 11. The tunnel boring machine 1a according to the first variation includes a center shaft 112 that supports the cutter head 11 and rotates along with the cutter head 11. The strain sensors 22 may be provided in the center shaft having a hollow cylindrical shape. The measurement data F of the cutter thrust force may be calculated from the strain measurement values of the strain sensors 22 in the center shaft 112. The center shaft 112 is an example of "a cutter support" of the present invention.

Figure 17A:
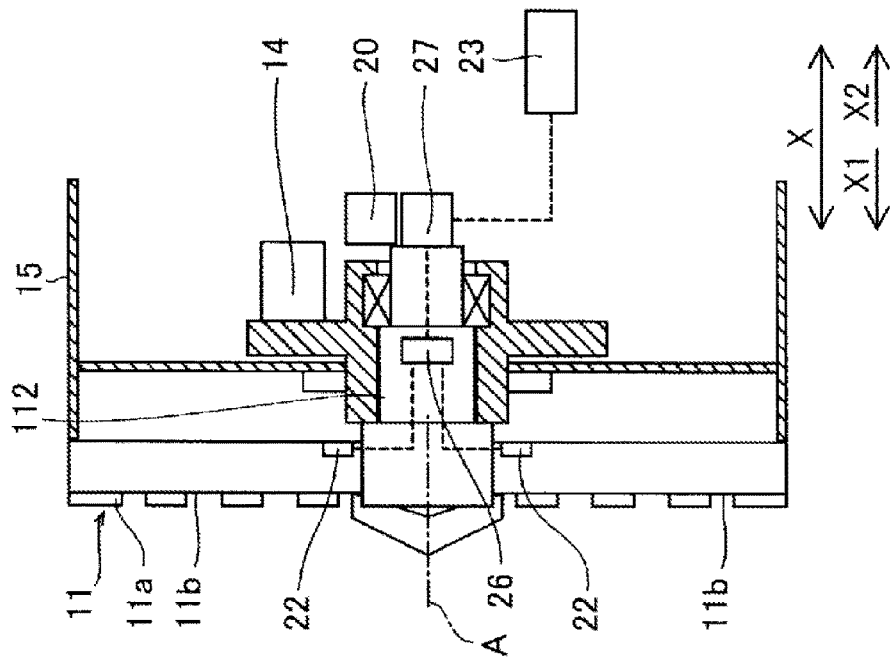
FIG. 17A is a schematic longitudinal sectional view of a second variation of the tunnel boring machine according to the first embodiment.
Figure 17B:
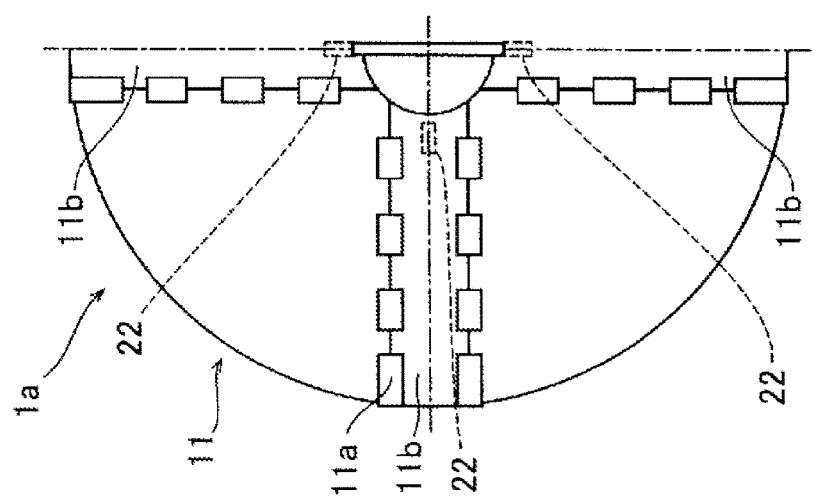
FIG. 17B is a schematic front view of a part of a second variation of the tunnel boring machine according to the first embodiment.

The second variation shown in FIGS. 17A and 17B is a tunnel boring machine 1a having the center shaft support structure. In the tunnel boring machine 1a, the strain sensors 22 may be provided in a spoke portion 11b constituting a part of the cutter head 11. The spoke portion 11b may have a hollow rectangular parallelepiped shape. The strain sensors 22 may be provided on the inner side surface of the spoke portion 11b. The measurement data F of the cutter thrust force may be calculated from the strain measurement values of the strain sensors 22 in the spoke portion 11b.

It may also be possible to combine the first embodiment and the second embodiment such that the strain sensors are provided in both the center shaft 112 and the spoke portion 11b. The strain sensors 22 may be provided in any one or both of the cutter head and the cutter support that rotates integrally with the cutter head at such a position that they can measure strain to calculate the cutter thrust force, and the strain sensors 22 may be provided at any positions in the cutter head and the cutter support.

In the first and second embodiments, one of the measurement value ($\theta+1$) and the measurement value ($\theta-1$) is regarded as the current measurement value Vp and the other is regarded as the corresponding measurement value Vo, and these measurement values are used to calculate the error data $E_r$, thereby to enable uniformed handling not depending on the rotation direction. However, the present invention is not limited to this example. In the present invention, it may also be possible to use the measurement value at the current angle $\theta$ as the current measurement value Vp and use the measurement value at the angle one rotation prior to the current angle $\theta$ as the corresponding measurement value Vo.

In this case, different data may be referred to depending on the rotation direction. In the positive rotation, the data referred to may be the current measurement value Vp=the measurement value ($\theta$), and the corresponding measurement value Vo=the measurement value ($\theta+1$). In the negative rotation, the data referred to may be the current measurement value Vp=the measurement value ($\theta$), and the corresponding measurement value Vo=the measurement value ($\theta-1$).

In the first embodiment, the encoder 20 may sense the rotational angle of the rotation base 13, but the present invention is not limited to this example. In the present invention, it may also be possible that the encoder senses the rotational angle of the output shaft of the cutter driving unit. The encoder may sense the rotational angle of any portion of the tunnel boring machine as long as it is possible to sense the rotational angle of the cutter head.

LIST OF REFERENCE NUMBERS

1, 1a tunnel boring machine
11 cutter head
12 cutter columns (cutter support)
14 cutter driving unit
20 rotary encoder (rotational angle sensing unit)
22 strain sensors
23 data processing device (data processing unit)
112 center shaft (cutter support)
$\theta$ current angle
$A_{op}$ an average value of the current measurement value and the corresponding measurement value
AG reference value
$E_r$ error data
F measurement data
Vo corresponding measurement value
Vp current measurement value

What is claimed is:

1. A tunnel boring machine, comprising:
a cutter head;
a cutter support supporting the cutter head and configured to rotate with the cutter head;
a cutter driving unit for rotationally driving the cutter head and the cutter support;
a rotational angle sensing unit for sensing a rotational angle of the cutter head;
a strain sensor provided in the cutter head or the cutter support; and
a data processing unit for obtaining measurement data (F) of a force acting on the cutter head, based on a measurement result of the strain sensor,
wherein the data processing unit is configured to obtain error data ($E_r$) based on a current measurement value (Vp) of the strain sensor obtained at a current angle ($\theta$) of the cutter head and a past corresponding measurement value (Vo) obtained at a rotational angle corresponding to the current angle, to correct the current measurement data using the error data.

2. The tunnel boring machine according to claim 1, wherein the corresponding measurement value is a measurement value of the strain sensor obtained one rotation prior to the current angle.

3. The tunnel boring machine according to claim 1, wherein the data processing unit is configured to calculate the error data using a reference value (AG), the current measurement value and the corresponding measurement value, the reference value being calculated using a plurality of measurement values of the strain sensor over at least one past rotation.

4. The tunnel boring machine according to claim 3, wherein the reference value is an average value of the measurement values of the strain sensor over one past rotation immediately prior to the current angle.

5. The tunnel boring machine according to claim 3, wherein the data processing unit is configured to calculate the error data by subtraction between the reference value and an average value ($A_{op}$) of the current measurement value and the corresponding measurement value.

6. The tunnel boring machine according to claim 1, wherein the data processing unit is configured to perform correction of the measurement data using the error data during rotation at least one rotation after the cutter head started rotating, and also configured to stop the correction of the measurement data using the error data when the cutter head has not been rotating for a prescribed amount of time or more.

* * * * *